US011182568B2

(12) United States Patent
Ishida et al.

(10) Patent No.: US 11,182,568 B2
(45) Date of Patent: Nov. 23, 2021

(54) SENTENCE EVALUATION APPARATUS AND SENTENCE EVALUATION METHOD

(71) Applicant: Panasonic Intellectual Property Management Co., Ltd., Osaka (JP)

(72) Inventors: Ryo Ishida, Osaka (JP); Taketoshi Nakao, Kyoto (JP); Mikio Morioka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 371 days.

(21) Appl. No.: 16/504,770

(22) Filed: Jul. 8, 2019

(65) Prior Publication Data

US 2019/0332678 A1 Oct. 31, 2019

Related U.S. Application Data

(63) Continuation of application No. PCT/JP2017/038781, filed on Oct. 26, 2017.

(30) Foreign Application Priority Data

Jan. 11, 2017 (JP) ............................. JP2017-002777

(51) Int. Cl.
*G06F 40/58* (2020.01)
*G06F 40/279* (2020.01)

(52) U.S. Cl.
CPC ............ *G06F 40/58* (2020.01); *G06F 40/279* (2020.01)

(58) Field of Classification Search
CPC ...... G06F 40/58; G06F 40/279; G06F 40/216; G06F 40/51

(Continued)

(56) References Cited

U.S. PATENT DOCUMENTS

2008/0270112 A1 10/2008 Shimohata

FOREIGN PATENT DOCUMENTS

| | | |
|---|---|---|
| JP | 2000-148756 | 5/2000 |
| JP | 2003-85172 | 3/2003 |
| JP | 2008-276517 | 11/2008 |

OTHER PUBLICATIONS

English translation of International Preliminary Report on Patentability dated Jul. 16, 2019 in International Application No. PCT/JP2017/038781.

(Continued)

*Primary Examiner* — Thierry L Pham
(74) *Attorney, Agent, or Firm* — Wenderoth, Lind & Ponack L.L.P.

(57) ABSTRACT

A sentence evaluation apparatus evaluates a sentence which is input. The sentence evaluation apparatus includes an acquisition device and a processor. The acquisition device acquires information indicating a first input sentence and information indicating a second input sentence. The processor executes information processing on the information acquired by the acquisition device, using an algorithm based on machine learning. The processor includes a first encoder that recognizes the first input sentence and a second encoder that recognizes the second input sentence, in the algorithm based on the machine learning. The processor generates evaluation information indicating evaluation on the first input sentence with reference to the second input sentence, based on a result of recognition by the first encoder on the first input sentence and a result of recognition by the second encoder on the second input sentence.

11 Claims, 15 Drawing Sheets

(58) Field of Classification Search
USPC .............................................................. 704/2
See application file for complete search history.

(56) References Cited

OTHER PUBLICATIONS

International Search Report dated Jan. 16, 2018 in International (PCT) Application No. PCT/JP2017/038781.
Kai Sheng Tai et al., "Improved Semantic Representations From Tree-Structured Long Short-Term Memory Networks", May 30, 2015.
D. Bollegala, "Deep Learning for Natural Language Processing", Artificial Intelligence, Mar. 1, 2014, vol. 29, No. 9, pp. 195-201 (with partial English translation).

PARALLEL CORPUS D1

| | ORIGINAL SENTENCE | REFERENCE SENTENCE |
|---|---|---|
| TRAINING DATA | これはペンです<br>(This is a pen) | This is a pen |
| | ⋮ | ⋮ |
| TEST DATA | 右手にあります<br>(It is on your right hand side) | It is on your right hand side |
| | ⋮ | ⋮ |

*Fig. 4*

LARNING DATA D2 FOR SUBJECTIVE EVALUATION

| TRANSLATED SENTENCE | REFERENCE SENTENCE | SUBJECTIVE EVALUATION RESULT |
|---|---|---|
| That's a dog | That is a dog | 4(Good) |
| ⋮ | ⋮ | ⋮ |

ORIGINAL SENTENCE

右手にあります
(Migite ni arimasu)

REFERENCE SENTENCE

It is on your right hand side

TRANSLATED SENTENCE

It is on your left       (SIMILARITY: 43.2%)
(Bad(1))

PROBLEMATIC SENTENCE     右側だ (Migigawa da)
It is on the left hand side
右にあります (Migi ni arimasu)
It is on your left side

SENTENCE EVALUATION APPARATUS AND SENTENCE EVALUATION METHOD

BACKGROUND

1. Technical Field

The present disclosure relates to a sentence evaluation apparatus and a sentence evaluation method for evaluating an input sentence.

2. Related Art

JP-A-2008-276517 discloses a translation evaluation device made in an attempt to improve efficiency of the evaluation for checking the translation performance or the translation ability of a translation machine and the like. In JP-A-2008-276517, a database for evaluation in which original texts and model translations are correlated with each other is generated in accordance with a purpose of the evaluation by a translation evaluation device. The translation evaluation device according to JP-A-2008-276517 automatically performs the translation evaluation based on the database for evaluation thus generated.

SUMMARY

The present disclosure provides a sentence evaluation apparatus and a sentence evaluation method that facilitate sentence evaluation for automatically evaluating sentences.

A sentence evaluation apparatus according to an aspect of the present disclosure evaluates an input sentence. The sentence evaluation apparatus includes an acquisition device and a processor. The acquisition device acquires information indicating a first input sentence and information indicating a second input sentence. The processor executes information processing on the information acquired by the acquisition device, using an algorithm based on machine learning. The processor includes a first encoder that recognizes the first input sentence and a second encoder that recognizes the second input sentence, in the algorithm based on the machine learning. The processor generates evaluation information indicating evaluation on the first input sentence with reference to the second input sentence, based on a result of recognition by the first encoder on the first input sentence and a result of recognition by the second encoder on the second input sentence.

A sentence evaluation method according to an aspect of the present disclosure is a method of evaluating a sentence input to a sentence evaluation apparatus.

With the sentence evaluation apparatus and the sentence evaluation method according to the present disclosure, the two encoders based on machine learning recognize input sentences so that appropriate automatic sentence evaluation can be facilitated.

BRIEF DESCRIPTION OF DRAWINGS

FIG. 4 is a diagram illustrating subjective evaluation learning data in the sentence evaluation apparatus;

DETAILED DESCRIPTION OF PREFERRED EMBODIMENTS

Embodiments will be described in detail below with reference to the drawings as appropriate. Note that an excessively detailed description may be omitted. For example, descriptions on details of matters that have been well known and redundant descriptions for substantially the same configurations may be omitted. This is for facilitating understanding by a person skilled in the art and for preventing the description below from being excessively redundant.

The attached drawings and the description below are provided by the applicant so that a person skilled in the art can sufficiently understand the present disclosure, and are not intended to be provided for limiting the subject matters described in claims.

First Embodiment

1. Configuration

In a first embodiment, a device and a method for sentence evaluation for automatically evaluating a translated sentence are described.

1-1. Overview

Figure 1:
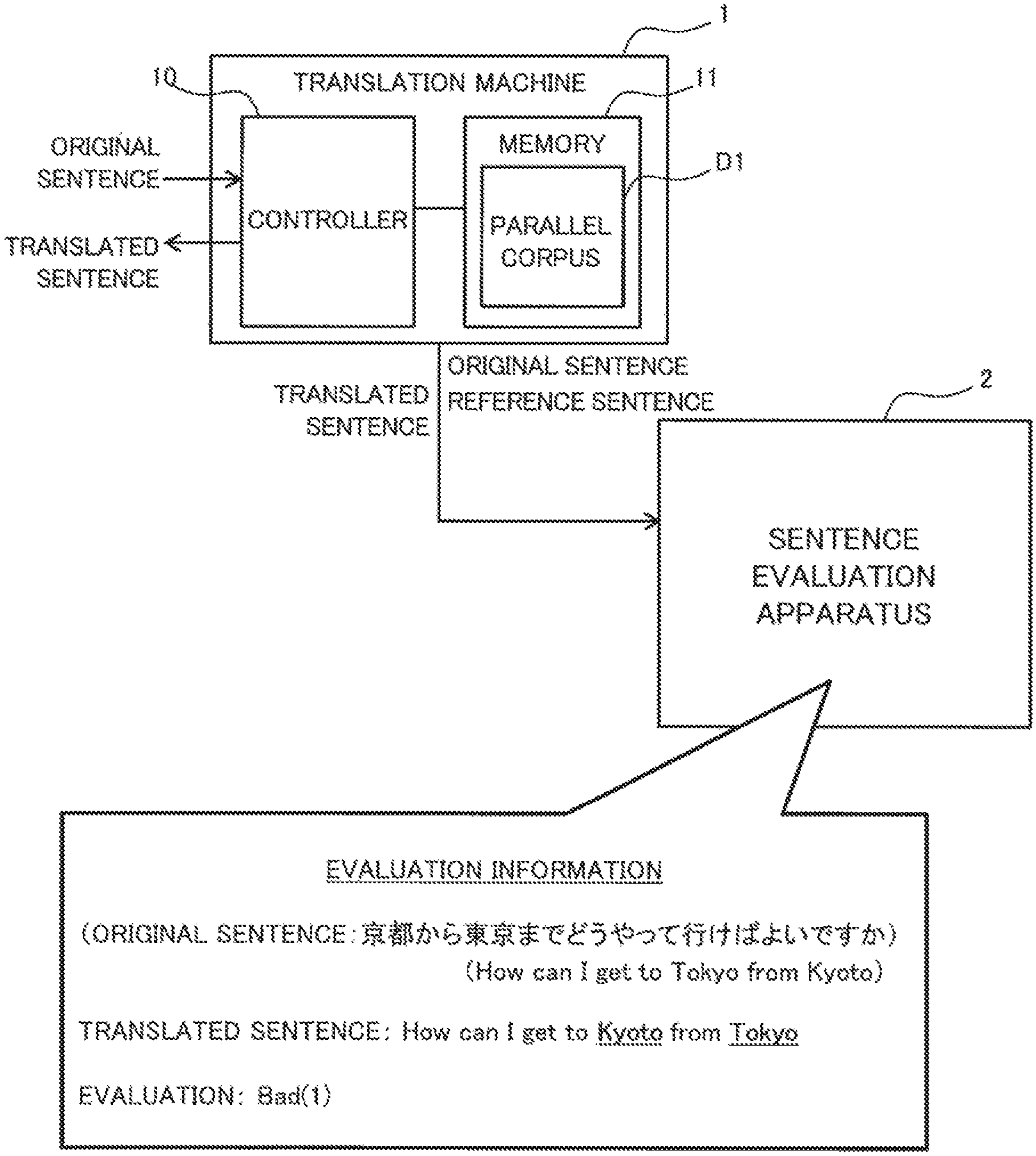
FIG. 1 is a diagram illustrating an overview of a sentence evaluation apparatus according to a first embodiment.

An overview of the device and the method for sentence evaluation according to the present embodiment is described with reference to FIG. 1. FIG. 1 is a diagram illustrating an overview of a sentence evaluation apparatus 2 according to the present embodiment.

In the present embodiment, as illustrated in FIG. 1, the sentence evaluation apparatus 2 is expected to implement subjective evaluation on the accuracy of a translated sentence obtained by a translation machine 1 through machine translation. The subjective evaluation is evaluation based on human's subjective point of view and includes, for example: comparing an output sentence (translated sentence) that is a translation result of the translation machine 1 with a reference sentence indicating an example of a correct translation of an input sentence (original sentence) input to the translation machine 1; and classifying the output sentence based on the accuracy of the translation from the input sentence.

For example, an output sentence "How can I get to Tokyo from Kyoto" output from the translation machine 1 in response to an input sentence "Kyoto kara Tokyo made dou yatte ikeba yoi desu ka (How can I get to Tokyo from Kyoto)" can be regarded as a correct translation. Thus, as a result of the subjective evaluation, such an output sentence from the translation machine 1 is classified as "Good(4)", which is the highest grade in a four-grade evaluation with grades including "Bad(1)", "Not-Good(2)", "So-so(3)" and "Good(4)".

On the other hand, the translation machine 1 may output an output sentence "How can I get to Kyoto from Tokyo" in response to the input sentence. In this sentence, the positions of the two words "Kyoto" and "Tokyo" are swapped from those in the output sentence with the evaluation "Good(4)". Thus, the output sentence is regarded as a translation result with a wrong meaning. Thus, as a result of the subjective evaluation, such a translated sentence is classified as "Bad (1)" which is the lowest grade for example.

Generally, the subjective evaluation described above to evaluate the performance of the translation machine 1 has conventionally been achieved through manual operations involving a huge manual work volume. For example, BLEU has been known as an index for automatically implementing the performance evaluation on the translation machine 1 (see JP-A-2008-276517). The evaluation by BLEU features counting the number of matching words between a reference sentence and an output sentence. Unfortunately, evaluation of a meaning of the sentence is difficult to implement with such a scheme.

This drawback will be described with an example where a first output sentence and a second output sentence respectively have "left" and "right hand side" in a portion corresponding to a word "right" in the reference sentence. Here, the number of words different from the reference sentence is counted to be one in the first output sentence and to be two in the second output sentence. With BLEU, the first output sentence ("left") with the opposite meaning from the reference sentence ("right") is evaluated higher than the second output sentence ("right hand side") which has different words having the same meaning as the word in the reference sentence. Thus, with BLEU, evaluation conforming to human's subjective grading is difficult to implement.

In view of the above, the present embodiment introduces machine learning into a method of automatically evaluating a translated sentence by the sentence evaluation apparatus 2, so that the sentence evaluation apparatus 2 can have an evaluation standard conforming to human's subjective grading. Hereinafter, an example of the translation machine 1 that is an evaluation target in the present embodiment, and a configuration of the sentence evaluation apparatus 2 according to the present embodiment are described.

1-2. Translation Machine

In an example of the present embodiment, the translation machine 1 is assumed to execute translation processing based on machine learning. An example of the translation machine 1 according to the present embodiment is described with reference to FIG. 1.

In this example, the translation machine 1 includes a controller 10 and a memory 11 as illustrated in FIG. 1. The translation machine 1 is formed of a personal computer (PC) for example. The translation machine 1 may be formed of various information terminals, a server device, or the like.

In the translation machine 1, the controller 10 entirely controls the operations of components of the translation machine 1. For example, the controller 10 includes a central processing unit (CPU) that cooperates with software to implement a predetermined function. The controller 10 reads data and a program stored in the memory 11 to execute various types of calculation processing to implement various functions of the translation machine 1.

For example, the controller 10 execute translation processing based on machine translation and controls the machine learning for the translation processing. The translation processing outputs a translated sentence as a result of the machine translation from an original sentence in a translation target language (Japanese, for example) into an output language (English, for example) different from the input language. The input language and the output language may be various natural languages. The controller 10 performs communication control including receiving various types of input information including an original sentence and transmitting various types of output information including a translated sentence, as appropriate.

The memory 11 is a storage medium that stores a program and data required for implementing the functions of the translation machine 1, and is formed of hard disk (such as hard disk drive (HDD)) and a semiconductor storage device (such as solid state drive (SSD)) for example. For example, the memory 11 stores a program and various parameters as well as a parallel corpus D1, information about the vocabulary of the input and output languages, and the like, used by the translation machine 1 to execute the translation processing. The parallel corpus D1 is described with reference to FIG. 2.

Figure 2:
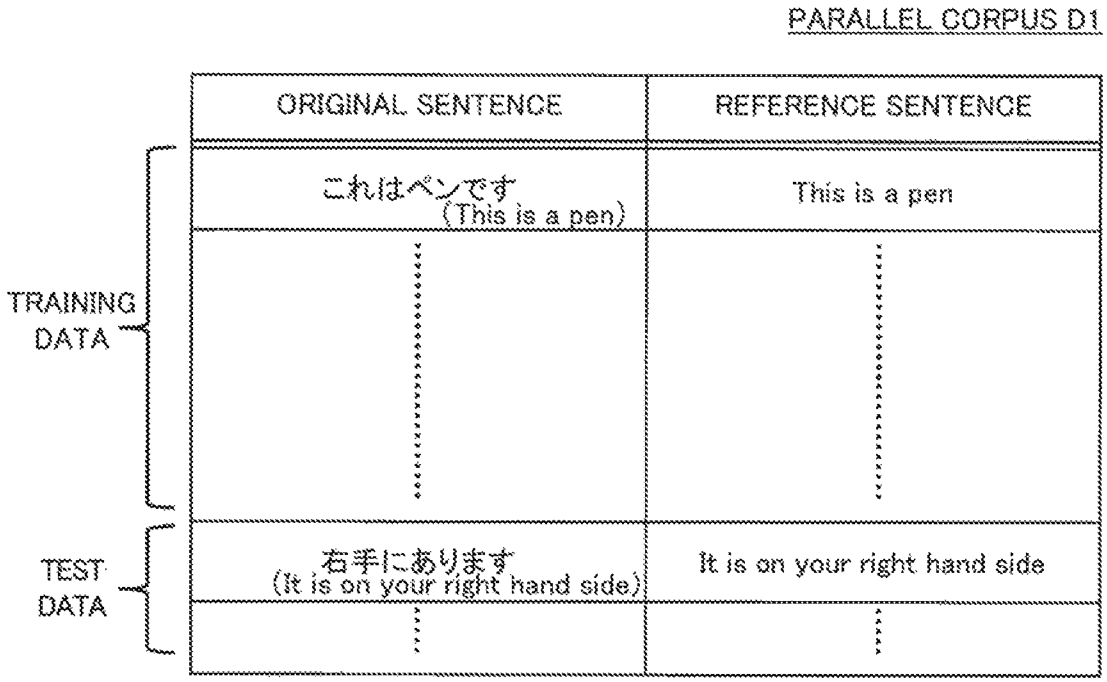
FIG. 2 is a diagram illustrating a parallel corpus in a translation machine.

FIG. 2 is a diagram illustrating the parallel corpus D1 in the translation machine 1. The parallel corpus D1 is a corpus representing parallel translations between the input and the output languages to be used for machine learning of the translation machine 1. As illustrated in FIG. 2, in the parallel corpus D1, the original sentence and the reference sentence are correlated to be recorded as a pair. In the parallel corpus D1, the original sentence is an example sentence in the input language to be input to the translation machine 1 for learning and the like. The reference sentence is an example sentence indicating a correct translation, in the output language translated from the original sentence correlated to the parallel corpus D1.

For example, the parallel corpus D1 stores a huge amount of data on original sentences and reference sentences such as 100 thousand sentences (pairs) including 90 thousand sentences serving as training data and 10 thousand sentences serving as test data. For example, the training data in the parallel corpus D1 is used for the machine learning of the translation machine 1 and the remaining test data is used for performance evaluation on the translation machine 1.

The translation machine 1 based on the machine learning described above may be used in a case where a plurality of types of the translation machines 1 with different learning results are handled. In such a case, the manual subjective evaluation needs to be performed on each of a plurality of types of translation machines 1, despite the fact that such evaluation requires an extremely large amount of work for evaluating a single type of translation machine 1. In view of this, the method and the device 2 for sentence evaluation according to the present embodiment can also narrow down the plurality of types of translation machines 1 to the targets of the manual subjective evaluation, so that the amount of work to be manually performed can be reduced.

1-3. Configuration of Sentence Evaluation Apparatus

Figure 3:
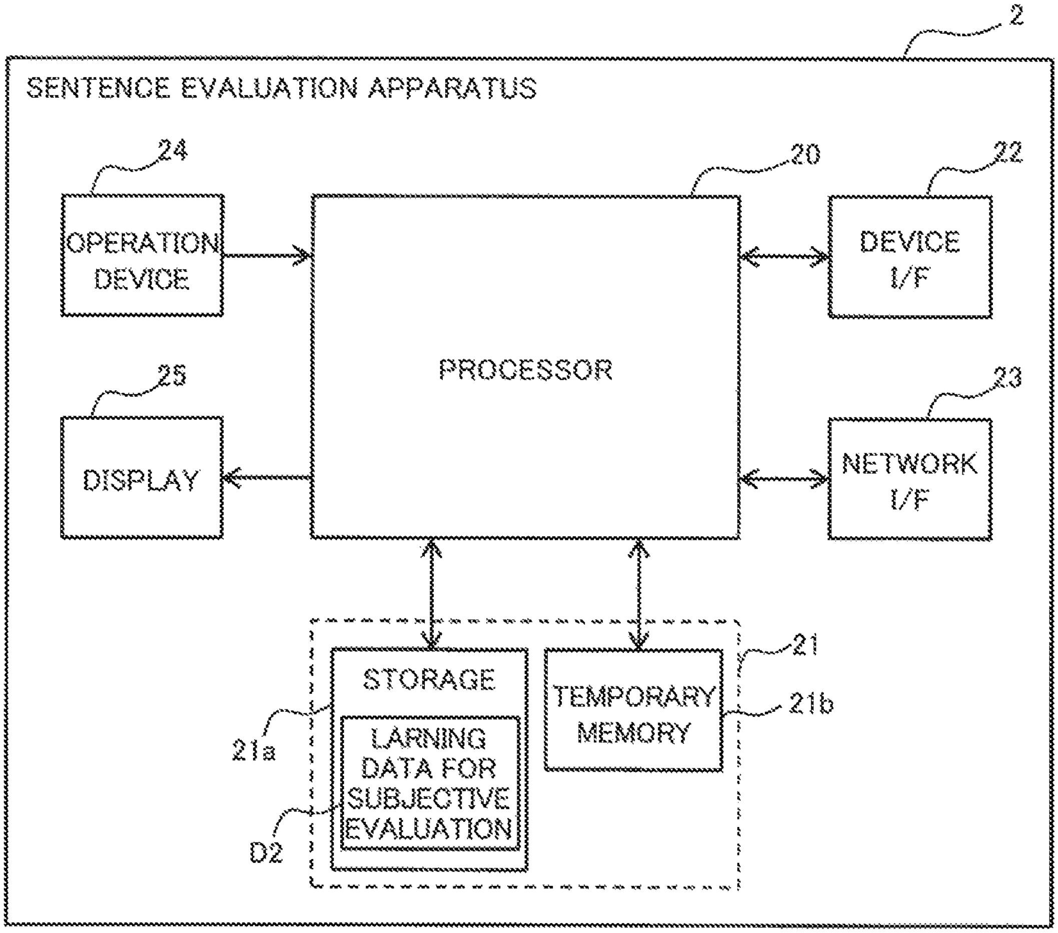
FIG. 3 is a block diagram illustrating an example of a configuration of the sentence evaluation apparatus according to the first embodiment.

A hardware configuration of the sentence evaluation apparatus 2 according to the present embodiment is described with reference to FIG. 3. FIG. 3 is a block diagram illustrating an example of the configuration of the sentence evaluation apparatus 2.

The sentence evaluation apparatus 2 may be formed of an information processing device such as a PC or various information terminals for example. As illustrated in FIG. 3, the sentence evaluation apparatus 2 includes a processor 20, a memory 21, a device interface 22, and a network interface 23 ("interface" is hereinafter referred to as "I/F"). The sentence evaluation apparatus 2 includes an operation device 24 and a display 25.

For example, the processor 20 includes a CPU and a graphics processing unit (GPU) that cooperates with software to implement predetermined functions, and entirely controls the operations performed by the sentence evaluation apparatus 2. The processor 20 reads data and a program stored in the memory 21 for executing various types of calculation processing, to implement various functions. For example, the processor 20 executes a program for establishing a deep neural network described later. The program may be provided from various communication networks or may be the one stored in a portable recording medium.

The processor 20 may be a hardware circuit including a dedicated electronic circuit designed for implementing a predetermined function and a reconstructible electronic circuit. The processor 20 may be formed by various semiconductor integrated circuit including a CPU, a micro processing unit (MPU), a GPU, a general-purpose computing on graphics processing units (GPGPU), a tensor processing unit (TPU), a microcomputer, a demand-side platform (DSP), a field-programmable gate array (FPGA), and an application specific integrated circuit (ASIC).

The memory 21 is a storage medium that stores a program and data required for implementing the functions of the sentence evaluation apparatus 2. For example, the memory 21 stores a group of parameters (hereinafter, referred to as "learning parameters") to be learned for functioning as a neural network performing the machine learning. As illustrated in FIG. 3, the memory 21 includes a storage 21*a* and a temporary memory 21*b*.

The storage 21*a* stores a parameter, data, a control program, and the like for implementing a predetermined function. For example, the storage 21*a* is formed by an HDD or an SSD. For example, the storage 21*a* stores a program for the deep neural network, a (learned) learning parameter, subjective evaluation learning data D2, and the like. The subjective evaluation learning data D2 will be described later.

For example, the temporary memory 21*b* is formed by a random access memory (RAM) such as a dynamic RAM or a static RAM, and temporary stores (holds) data. The temporary memory 21*b* may function as a working area for the processor 20, and may be formed by a storage area in an internal memory of the processor 20. The temporary memory 21*b* holds various vector variables and learning parameters (being learned) generated in the deep neural network. For example, when high speed calculation is performed by a GPU, various parameters and an intermediate result (intermediate vector) of the ongoing calculation are held in the storage area on the GPU.

The device I/F 22 is a circuit (module) for connecting an external device such as the translation machine 1 to the sentence evaluation apparatus 2. The device I/F 22 is an example of an acquisition device that performs communications conforming to a predetermined communication standard. The predetermined standard includes a universal serial bus (USB), High-Definition Multimedia Interface (HDMI) (registered trademark), IEEE1395, WiFi, and Bluetooth (registered trademark).

The network I/F 23 is a circuit (module) for connecting the sentence evaluation apparatus 2 to a communication network through a wireless or wired communication line. The network I/F 23 is an example of an acquisition device that performs communications conforming to a predetermined communication standard. The predetermined communication standard includes a communication standard such as IEEE802.3, and IEEE802.11a/11b/11g/11ac.

The operation device 24 is a user interface on which a user performs an operation. The operation device 24 includes a keyboard, a touch pad, a touch panel, a button, a switch, and a combination of these. The operation device 24 is an example of an acquisition device that acquires various types of information input by the user. The acquisition device of the sentence evaluation apparatus 2 may acquire various types of information by loading various types of information stored in various storage mediums (for example, the storage 21*a*) onto an operation area (for example, the temporary memory 21*b*) for the processor 20.

For example, the display 25 includes a liquid crystal display and an organic electroluminescence (EL) display. For example, the display 25 displays various types of information such as information received from the operation device 24.

The above describes an example of the sentence evaluation apparatus 2 formed of a PC and the like. The sentence evaluation apparatus 2 according to the present disclosure is not limited to this and may be various information processing devices. For example, the sentence evaluation apparatus 2 may be one or a plurality of server devices such as an Active Server Pages (ASP) server. For example, the sentence evaluation apparatus 2 may acquire a translated sentence input from the outside through a communication network by using the network I/F 23, and execute information processing based on the deep neural network. The sentence evaluation apparatus 2 may transmit information about a result of executing the information processing to the outside through a communication network. The deep neural network according to the present disclosure may be established in a computer cluster or a cloud computing.

1-3-1. Subjective Evaluation Learning Data

The subjective evaluation learning data D2 is described with reference to FIG. 4. FIG. 4 is a diagram illustrating subject evaluation learning data in the sentence evaluation apparatus 2.

The subject evaluation learning data D2 is data to be learned by the sentence evaluation apparatus 2 in the machine learning of the sentence evaluation apparatus 2. As illustrated in FIG. 4, in the subject evaluation learning data D2, a translated sentence, a reference sentence, and a subjective evaluation result are recorded in association with each other. The subjective evaluation result is a result of subjective evaluation performed in advance on a translated sentence relative to a reference sentence correlated thereto in the subjective evaluation learning data D2, and is stored as a value of the four grades evaluation ("1" to "4") for example.

The subjective evaluation learning data D2 is generated based on subjective evaluation manually conducted in the past for example. Through such machine learning using the subjective evaluation learning data D2, the sentence evaluation apparatus 2 can have an evaluation standard conforming to human's subjective grading in the subjective evaluation performed in the past.

2. Operation

An operation performed by the sentence evaluation apparatus 2 having the above described configuration is descried below.

2-1. Operation Overview

Figure 5:
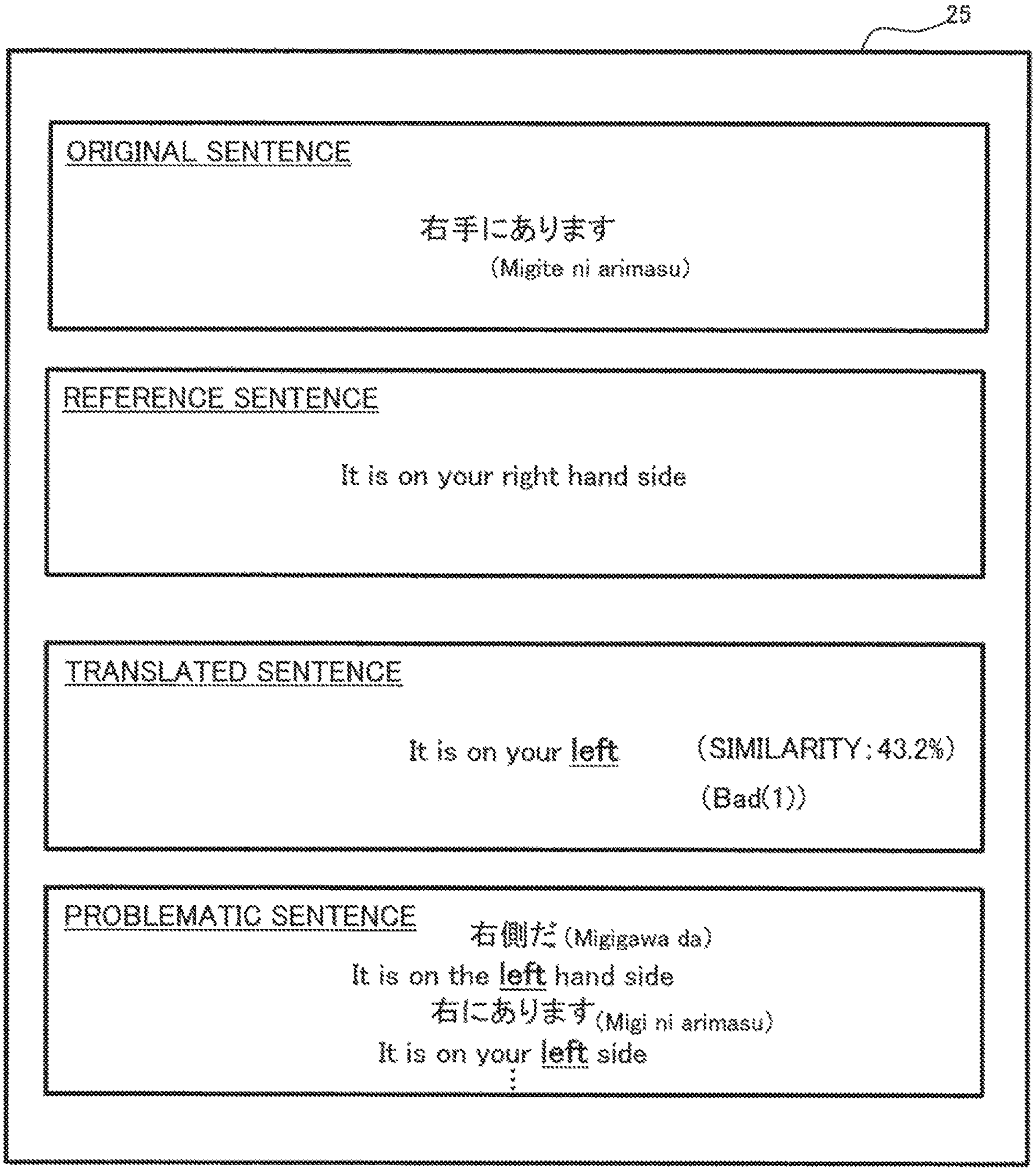
FIG. 5 is a diagram illustrating a display example of a user interface of the sentence evaluation apparatus.

An overview of the operation performed by the sentence evaluation apparatus 2 according to the present embodiment is described with reference to FIG. 5. FIG. 5 is a diagram illustrating a display example of a user interface of the sentence evaluation apparatus 2.

In an example described in the present embodiment, the translation machine 1 translates a translating original text with using test data not used in learning by the translation machine 1 in the parallel corpus D1 (FIG. 2) when the sentence evaluation apparatus 2 performs evaluation. In the display example illustrated in FIG. 5, the display 25 of the sentence evaluation apparatus 2 displays an original sentence “Migite ni arimasu” and a reference sentence “It is on your right hand side”. In the display example in FIG. 5, a translated sentence “It is on your left” is displayed as the translation result by the translation machine 1.

In the display example in FIG. 5, the sentence evaluation apparatus 2 displays as a result of evaluation on the translated sentence: a part “left” in the translated sentence in an emphasized manner; and evaluation and similarity of the translated sentence relative to the reference sentence. The similarity indicates the level of similarity between the translated sentence and the reference sentence, and is displayed as a percentage in the display example.

In this example, “left” in the translated sentence corresponds to a portion that is “right” in the reference sentence, and thus the translated sentence and the reference sentence (original sentence) can be regarded as having the opposite meanings. Thus, the sentence evaluation apparatus 2 according to the present embodiment detects “left” in the translated sentence as a dissimilar segment that is dissimilar to the reference sentence, and calculates the similarity and the like based on this detection result.

In the display example, problematic sentences are listed. The problematic sentence is a learned sentence regarded as a cause of the mistranslation, made by the translation machine 1, including the dissimilar segment “left” which is supposed to be “right” in the original sentence. The problematic sentence is anticipated to be included as the reference sentence (and original sentence) in the parallel corpus D1. The sentence evaluation apparatus 2 according to the present embodiment can also search the parallel corpus D1 of the translation machine 1 for the problematic sentence, through the detection of the dissimilar segment. The operation performed by the sentence evaluation apparatus 2 according to the present embodiment will be described in detail below.

2-2. Operation in Execution Mode

An overall operation performed by the sentence evaluation apparatus 2 according to the present embodiment in an execution mode for executing the sentence evaluation method is described with reference to FIG. 6.

Figure 6:
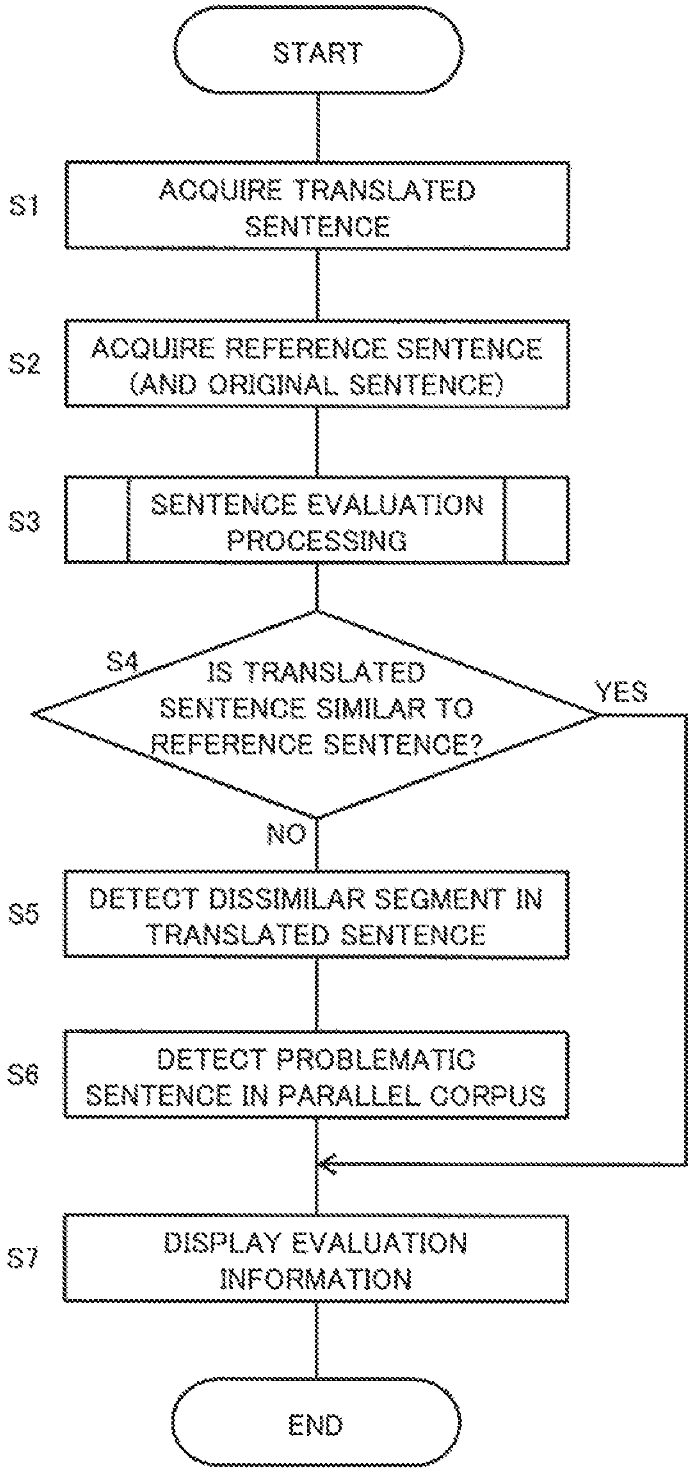
FIG. 6 is a flowchart illustrating an operation performed by the sentence evaluation apparatus according to the first embodiment in an execution mode.

FIG. 6 is a flowchart illustrating an operation performed by the sentence evaluation apparatus 2 in the execution mode. The flowchart illustrated in FIG. 6 is implemented by the processor 20 in a state where the machine learning by the sentence evaluation apparatus 2 has been completed.

At first, the sentence evaluation apparatus 2 acquires a translated sentence from the translation machine 1 through the device I/F 22 (or the network I/F 23) for example (S1). In the present embodiment, the translation machine 1 performs machine translation on an original sentence in test data in the parallel corpus D1, and transmits the resultant translated sentence to the sentence evaluation apparatus 2. The translated sentence acquired in step S1 is an example of a first input sentence to be the target of the evaluation by the sentence evaluation apparatus 2 according to the present embodiment.

Next, for example, the sentence evaluation apparatus 2 acquires the original sentence that is a target of translation, as well as the reference sentence correlated with the original sentence in the parallel corpus D1 of the translation machine 1, from the translation machine 1 (S2). The reference sentence acquired in step S2 is an example of a second input sentence to be compared with the original sentence in the present embodiment.

Next, the sentence evaluation apparatus 2 executes the sentence evaluation processing based on the translated sentence and the reference sentence acquired (S3). The sentence evaluation processing is processing of generating evaluation information indicating the evaluation of the translated sentence relative to the reference sentence, based on deep learning. The evaluation information includes information indicating the similarity and information indicating a dissimilar segment in the translated sentence. The sentence evaluation processing in step S3 will be described in detail later.

Next, based on the evaluation information generated by the sentence evaluation processing (S3), the sentence evaluation apparatus 2 determines whether or not the translated sentence is similar to the reference sentence (S4). Specifically, the processor 20 of the sentence evaluation apparatus 2 compares the similarity in the evaluation information with a predetermined threshold value to execute the processing in step S4.

Upon determining that the translated sentence is not similar to the reference sentence (NO is S4), the sentence evaluation apparatus 2 detects a dissimilar segment in the translated sentence based on the evaluation information generated (S5). The dissimilar segment may be a single word or a phrase including a plurality of words in the translated sentence.

For example, the sentence evaluation apparatus 2 issues a command including information indicating the dissimilar segment detected to the translation machine 1 and cause the translation machine 1 to search the parallel corpus D1 for a problematic sentence including the dissimilar segment (S6). Based on the command received, the translation machine 1 searches the training data in the parallel corpus D1 for the problematic sentence, and the sentence evaluation apparatus 2 receives information indicating a result of the search from the translation machine 1.

Next, the sentence evaluation apparatus 2 displays the various pieces of evaluation information obtained in steps S3 to S6 on the display 25, as in the display example illustrated in FIG. 5 (S7). For example, the sentence evaluation apparatus 2 displays a percentage representing the similarity indicated by the evaluation information generated in step S3 and displays a grade (Bad(1)), corresponding to the similarity value (43.2%), in multi-grade evaluation such as four grades evaluation.

Upon determining that the translated sentence is similar to the reference sentence (YES in S4), the sentence evaluation apparatus 2 proceeds to the processing in step S7, without executing the processing in steps S5 and S6 (S7). In such a case, the sentence evaluation apparatus 2 displays a similarity and a grade, in the multi-grade evaluation, corresponding to the similarity, on the display 25.

The processing in the flowchart is terminated when the sentence evaluation apparatus 2 displays the various pieces of evaluation information (S7).

With the processing described above, the sentence evaluation apparatus 2 can automatically implement the subjective evaluation on the translation result obtained by the translation machine 1.

In the processing described above, the acquisition of the original sentence in step S2 can be omitted as appropriate. The source of the reference sentence is not limited to the translation machine 1. The reference sentence may be acquired from a storage medium storing in advance data that is the same as the parallel corpus D1 used by the translation machine 1 for learning. The processing described above may be executed by using a parallel corpus separately prepared.

In the example described above, the target of the evaluation by the sentence evaluation apparatus 2 is a result of the translation by the translation machine 1. However, this should not be construed in a limiting sense, and the target of the evaluation by the sentence evaluation apparatus 2 may be a translated sentence input by the user for example.

2-3. Sentence Evaluation Processing

The sentence evaluation processing in step S3 in FIG. 6 is described below. In the present embodiment, the sentence evaluation processing is executed with the sentence evaluation apparatus 2 establishing the deep neural network that is the target of the deep learning. A deep neural network according to the present embodiment is described with reference to FIG. 7.

2-3-1. Deep Neural Network

Figure 7:
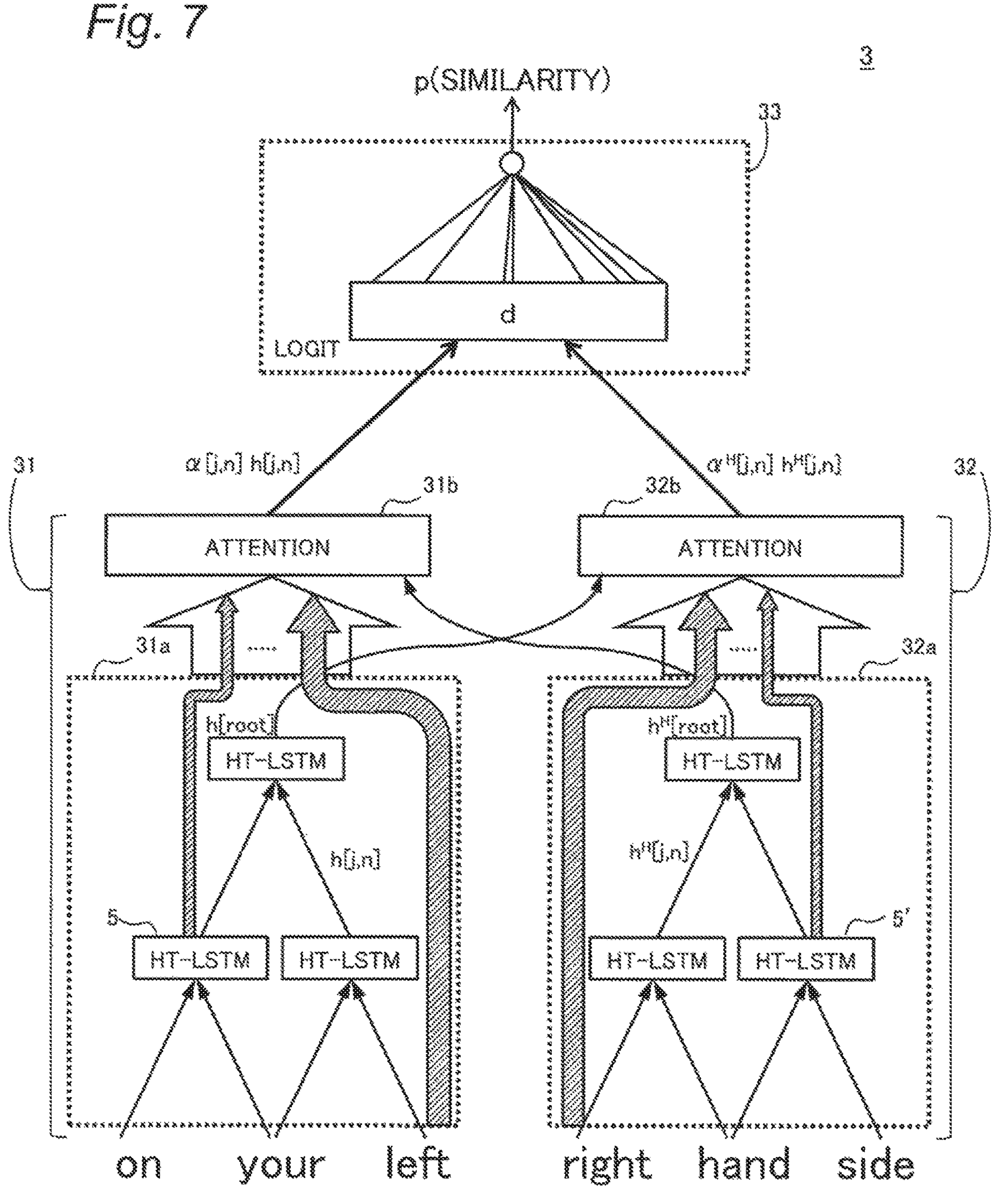
FIG. 7 is a diagram illustrating a deep neural network in the sentence evaluation apparatus.

FIG. 7 is a diagram illustrating a deep neural network 3 in the sentence evaluation apparatus 2. In the present embodiment, the deep neural network 3 is established in the processor 20 (FIG. 3) of the sentence evaluation apparatus 2.

As illustrated in FIG. 7, the deep neural network 3 according to the present embodiment includes a first encoder 31 for recognizing a translated sentence, a second encoder 32 for recognizing a reference sentence, and a fully connected layer 33. FIG. 7 illustrates an example where a translated sentence "on your left" and a reference sentence "right hand side" are respectively input to the first encoder 31 and the second encoder 32 of the deep neural network 3, for the sake of simplicity of the description.

The first encoder 31 includes a first tree long short-term memory (LSTM) processing unit 31*a* and a first attention processing unit 31*b*. Similarly, the second encoder 32 includes a second tree LSTM processing unit 32*a* and a second attention processing unit 32*b*.

The first tree LSTM processing unit 31*a* executes processing of recognizing the translated sentence acquired in step S1 in FIG. 6, based on a predetermined data structure. In the present embodiment, the first tree LSTM processing unit 31*a* recognizes the translated sentence in a data structure exhaustively including parent nodes each including two nodes as a set of child nodes as in the case of a binary tree in a tree structure for example.

For example, in the example illustrated in FIG. 7, two consecutive words "on" and "your" in the translated sentence "on your left" are recognized as a set of child nodes, a phrase "on your" including these two words is recognized as a parent node, and a phrase "your left" including two words "your" and "left" is further recognized as the next parent node. When the phrases each including two words are all recognized, these recognized phrases are then used as child nodes for sequentially recognizing parent nodes corresponding to phrases each including a larger number of words. This recognition processing is repeated until a parent node (h[root]) corresponding to the entire processing target text is recognized.

The data structure described above is similar to a general tree structure in that a plurality of nodes are included as elements in tires (generation) from the root node corresponding to the entire processing target text to a leaf node corresponding to each word in the text. The plurality of nodes are associated with one another in a parent-child relationship with the parent node and the child node respectively being on an upper level side and a lower level side in terms of generations, and a parent node may include a plurality of child nodes (brother nodes). Furthermore, the data structure may include partially overlapping tree structures. For example, child nodes of adjacent parent nodes may partially overlap. The data represented by such a data structure is hereinafter referred to as "tree data".

The first tree LSTM processing unit 31*a* includes a highway tree (HT) LSTM unit 5 that executes recognition processing on each element in the tree data. The HT-LSTM unit 5 executes processing based on an HT-LSTM that is a novel neural network according to the present disclosure. The HT-LSTM unit 5 is described in detail later.

Figure 8:
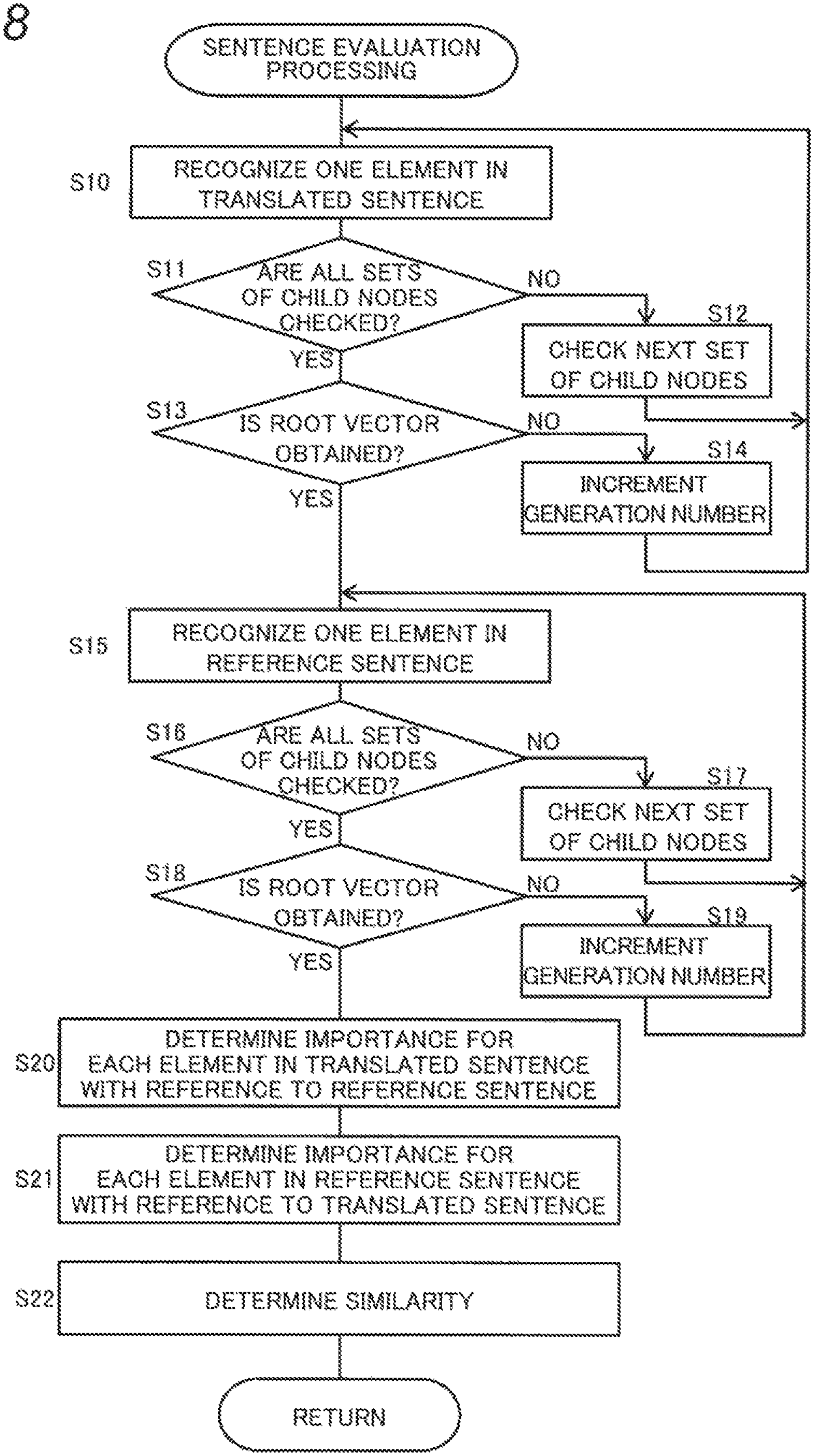
FIG. 8 is a flowchart illustrating sentence evaluation processing executed by the deep neural network.

The first attention processing unit 31*b* is formed of a feedforward neural network and executes attention processing for determining the importance of each element in the tree data of the translated sentence, based on the recognition result obtained by the first tree LSTM processing unit 31*a* (see S20 in FIG. 8). The processing is executed with reference to the recognition result obtained by the second tree LSTM processing unit 32*a*, for obtaining the importance relative to the reference sentence. The attention processing will be described in detail later.

The first tree LSTM processing unit 31*a* and the first attention processing unit 31*b* implement the first encoder 31 that encodes (that is, recognizes) a translated sentence into (as) tree data in the deep neural network 3.

The second tree LSTM processing unit 32*a* recognizes as tree data the reference sentence acquired in step S2 in FIG. 6 based on the data structure described above for example. For example, the second tree LSTM processing unit 32*a* includes an HT-LSTM unit 5' executing the recognition processing for each element of the tree data, as in the case of the HT-LSTM unit 5 of the first tree LSTM processing unit 31*a*. These two HT-LSTM units 5 and 5' have different learning parameters for example.

The second attention processing unit 32*b* executes processing similar to that executed by the first attention processing unit 31*b*, with interchanging the recognition results between the first and second tree LSTM processing units 31*a* and 32*a*, to determine the importance of each element in the tree data of the reference sentence (see S21 in FIG. 8). For example, the second attention processing unit 32*b* has a configuration similar to that of the first attention processing unit 31*b* but has learning parameters different therefrom.

The second tree LSTM processing unit 32*a* and the second attention processing unit 32*b* implement the second encoder 32 that encodes a reference sentence in the deep neural network 3.

The fully connected layer 33 calculates a similarity between the translated sentence and the reference sentence through a logit model calculation, based on the results of the encoding by the first and the second encoders 31 and 32 (S22 in FIG. 8). The similarity calculation processing by the fully connected layer 33 will be described in detail later.

2-3-2. Detail of Sentence Evaluation Processing

The sentence evaluation processing (S3 in FIG. 6) with the deep neural network 3 established as described above is described in detail with reference to FIGS. 7 and 8. FIG. 8 is a flowchart illustrating the sentence evaluation processing.

The flowchart in FIG. 8 is implemented by the processor 20 (FIG. 3) of the sentence evaluation apparatus 2 in a state where the translated sentence and reference sentence has been acquired (S1 and S2 in FIG. 6).

At first, the processor 20 functions as the HT-LSTM unit 5 of the first tree LSTM processing unit 31*a* (see FIG. 7), and recognizes a parent node corresponding to one set of child nodes in the tree data of the translated sentence (S10). In the processing, the processor 20 generates an output vector h[j,n] as a result of recognizing the parent node, and records the vector in the memory 21 (storage 21*a* for example).

Here, the subscript j of the output vector h[j,n] described above indicates the generation number indicating the generation of one element (node) in the tree data. For the example, the generation number of a child node corresponding to a parent node with the generation number "j" is "j−1" for example. The subscript n is a number for identifying each element in a single generation of the tree data. The subscription n is smaller for an element on a side (hereinafter, referred to as "the left side") closer to the beginning of the sentence, in the sequence of the processing target sentence, and is larger for an element closer to the end of the sentence (hereinafter, referred to as "the right side").

In the present embodiment, the processor 20 checks a set of two adjacent child nodes in the elements with the generation number (j−1) in step S10. The processor 20 executes HT-LSTM calculation processing described later, based on output vectors h[j−1,n] and h[j−1,n+1] respectively corresponding to the set of child nodes checked, to generate the output vector h[j,n] of the parent node.

Next, the processor 20 determines whether or not all the sets of adjacent child nodes have been checked, based on the subscription n of the pair of child nodes checked for example (S11). The determination in step S11 is performed to exhaustively recognize all the parent nodes corresponding to various sets of child nodes, with a predetermined generation number j. Upon determining that not all the sets of child nodes have been checked (NO in S11), the processor 20 checks the next set of child nodes in the sequence from the left side to the right side in the processing target sentence (S12). Then, the processing returns to step S10.

For example, in the example illustrated in FIG. 7, the processor 20 recognizes the parent node corresponding to the phrase "on your" from the two words "on", and "your". Then, with the determination in step S11 resulting in "NO", the processor 20 checks a set of child nodes, which is one word on the right side, corresponding to two words "your" and "left" (S12). As a result, a parent node corresponding to the new phrase "your left" from the two words "your" and "left" (S10).

On the other hand, upon determining that all the set of child nodes with the predetermined generation number j have been checked (YES in S11), the processor 20 determines whether or not the root vector h[root] is obtained (S13). The root vector h[root] corresponds to the output vector in a case where the root node in the tree data is recognized as the parent node, and is represented by h[root]=h[J,1], where J is the maximum number of the generation number j for example.

Upon determining that the root vector h[root] has not been acquired yet (NO in S13), the processor 20 increments the generation number j (S14), and the processing returns to step S10. Thus, the processor 20 repeats the processing in steps S10 to S14, until all the elements in the tree data of the translated sentence are recognized.

For example, in the example illustrated in FIG. 5, when the processor 20 recognizes the parent node corresponding to the phrase "your left" (S10), the result of the determination in step S11 is "YES", and the result of the determination in step S13 is "NO". Then, in step S10 in the next loop, the processor 20 generates the root vector h[root] corresponding to the entire translated sentence "on your left", as a result of recognizing the parent nodes corresponding to the two consecutive phrases "on your" and "your left". As a result, the processor 20 determines "YES" in step S14.

Upon determining that the root vector h[root] of the translated sentence is obtained (YES in S14), the processor 20 terminates the recognition for the tree data of the translated sentence, and the processing proceeds to step S15. Through the processing steps S10 to S14, a set of output vectors {h[j,n]} is obtained as a result of the recognition on the tree data of the translated sentence.

In steps S15 to S19, the processor 20 functions as the second tree LSTM processing unit 32*a* and executes processing similar to that in steps S10 to S14 on the reference sentence for example. The processor 20 functions as the HT-LSTM unit 5' and repeats the processing in steps S15 to S19 until a root vector $h^H$[root] of the reference sentence is generated, and records a set of output vectors {$h^H$[j,n]} of the reference sentence as a result of recognizing the tree data of the reference sentence in the memory 21. The processing in steps S15 to S19 may not be executed after the processing in steps S10 to S14 and may be executed in parallel with the processing in steps S10 to S14.

Next, the processor 20 functions as the first attention processing unit 31*b* to execute the attention processing to determine the importance of each element {h[j,n]} of the tree data of the translated sentence, recognized by the first LSTM processing unit 31*a*, relative to the reference sentence (S20). Specifically, in the attention processing in step S20, the processor 20 performs calculation with the following Formulae (1) and (2) using the root vector $h^H$[root] of the reference sentence for each output vector h[j,n] of the translated sentence, to calculate a coefficient α[j,n] for each output vector h[j,n].

$$\alpha[j,n]=\exp\ (e[j,n])/\Sigma_{j,n}\ \exp\ (e[j,n]) \quad (1)$$

$$e[j,n]=F(h[j,n],h^H[\mathrm{root}]) \quad (2)$$

In Formula (1) described above, the coefficient α[j,n] indicates the importance of an element in the tree data, recognized with the corresponding output vector h[j,n], relative to the reference sentence. In the formula, $\Sigma_{j,n}$ represents a sum over the entire nodes of the tree data of the translated sentence, and exp represents an exponential function. In Formula (2) described above, F represents a predetermined scalar value function represented by the following Formula (3) for example.

$$F(h[j,n],h^H[\mathrm{root}])=\tanh\ (W_F h[j,n]+W_{FH} h^H[\mathrm{root}]+b_F) \quad (3)$$

In Formula (3) described above, tanh represents a hyperbolic tangent function. Furthermore, each of $W_F$ and $W_{FH}$ which forms a learning parameter represents a matrix with a single row (row vector), and $b_F$ represents a scalar bias term. It is to be noted that the function type of F is not limited to that in Formula (3) described above. For example, a sigmoid function, ReLU (normalized linear function), or an inner product "h[j,n]·$h^H$[root]" between vectors may be used instead of tanh. With a composite function, e[j,n] may be multilayered as appropriate.

According to Formula (1), with a set {α[j,n]} of coefficients α[j,n] obtained as a result of the processing in step S20, the elements {h[j,n]} of the tree data of the translated sentence are weighted based on the information about the reference sentence. The processor 20 records each coefficient α[j,n] calculated in the memory 21.

The processor 20 functions as the second attention processing unit 32*b* to execute the attention processing, and determines the importance of each element {$h^H$[j,n]} of the tree data of the reference sentence, recognized by the second LSTM processing unit 32*a*, relative to the translated sentence (S21). The processing in step S21 may be executed before, after, or in parallel with step S20.

The attention processing in step S21 is executed in a manner similar to that of the processing in step S20, by using the output vector $h^H$[j,n] of the reference sentence and the root vector h[root] of the translated sentence side. As a result, the coefficient $\alpha^H$[j,n] for each output vector $h^H$[j,n] of the reference sentence is calculated and recorded in the memory 21.

Next, the processor 20 functions as the fully connected layer 33 of the deep neural network 3 to execute processing of calculating a similarity p based on the recognition results {h[j,n]} and {$h^H$[j,n]} of the translated sentence and reference sentence and each of the importance determination results {α[j,n]} and {$\alpha^H$[j,n]} (S22). Specifically, the processor 20 performs calculation with the following Formulae (4) and (5) in step S22.

$$p=1/(1+\exp(W_p d+b_p)) \tag{4}$$

$$d=\Sigma_{j,n}\alpha[j,n]h[j,n]+\Sigma_{j,n}\alpha^H[j,n]h^H[j,n] \tag{5}$$

In Formula (4) described above, d represents a vector, $W_p$ which forms a learning parameter is a single row matrix, and $b_p$ is a scalar bias term. In Formula (5) described above, the sum of the first term covers the entire elements of the tree data of the translated sentence and the sum of the second term covers the entire elements of the tree data of the reference sentence.

With Formula (5) described above, in the fully connected layer 33, the elements {h[j,n]} and {$h^H$[j,n]} of the tree data of the translated sentence and the reference sentence are summed up based on weights corresponding to the importance {α[j,n]} and {$\alpha^H$[j,n]} thereof. The processor 20 calculates the similarity p, within a range between 0 and 1, using the logistic function (Formula (4)) based on the vector d which is the resultant sum. The similarity p with a value closer to "1" indicates a higher similarity between the translated sentence and the reference sentence, and the similarity p with a value closer to "0" indicates a higher dissimilarity therebetween.

The processing in step S3 in FIG. 6 is terminated when the processor 20 calculates the similarity p (step S22), and the processing proceeds to step S4.

With the processing described above, the first and the second encoders 31 and 32 recognize the tree data of each of the translated sentence and the reference sentence in the deep neural network 3, so that a word in the translated sentence can be compared with a phrase in the reference sentence. Thus, the sentence evaluation apparatus 2 can have a determination standard including a similarity in the meaning between "right" and "right hand side", for example.

With the processing described above, the fully connected layer 33 integrates the elements {h[j,n]} and {$h^H$[j,n]} of the tree data of the translated sentence and the reference sentence based on their importance {α[j,n]} and {$\alpha^H$[j,n]}, and outputs the similarity p between the two sentences (S22). According to Formulae (4) and (5) for the fully connected layer 33 (S22), it can be seen that in the elements {h[j,n]} of the tree data of the translated sentence, an element with "α[j,n]$W_p$h[j,n]" being a positive value contributes to the dissimilarity between the sentences, and an element with "α[j,n]$W_p$h[j,n]" being a negative value contributes to the similarity between the sentences (the same applies to the reference sentence).

This indicates that, in the example illustrated in FIG. 5 for example, the coefficients α[j,n] and $\alpha^H$[j,n] of the importance of the node "left" in the translated sentence and the node "right" in the reference sentence are expected to be calculated as larger values (see FIG. 7). Thus, for example, when the translated sentence and the reference sentence are dissimilar to each other, the processor 20 can detect an element with a larger coefficient α[j,n], calculated in step S20, of the tree data of the translated sentence, as a dissimilar segment (see S5 in FIG. 6).

With the processing described above using the data structure resembling a binary tree in the tree LSTM processing units 31*a* and 32*a* (FIG. 7) of the encoders 31 and 32, each input sentence can be recognized without performing parsing and the like in particular. For example, the recognition can be performed with sufficient rigidity even in the case where the translated sentence with a broken grammar is input.

In the description above, a translated sentence and a reference sentence are recognized in a data structure resembling the binary tree (S10 to S19). However, the data structure used for recognizing each sentence is not limited this. For example, a normal binary tree (with no overlapping child nodes) as well as various tree structures may be used. In the description above, the first and the second tree LSTM processing units 31*a* and 32*a* use the same data structure, but may use different data structures. A modification of the data structure in the sentence evaluation processing is described with reference to FIG. 9.

Figure 9:
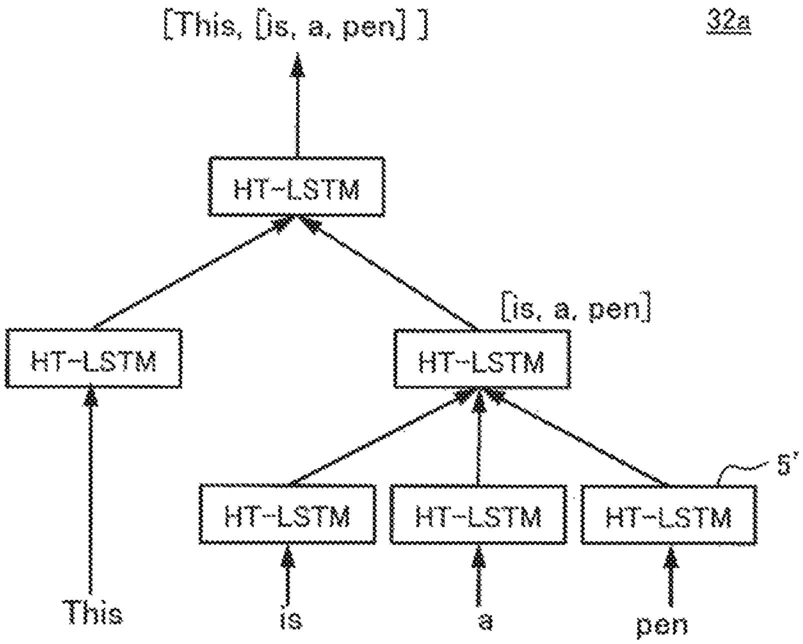
FIG. 9 is a diagram illustrating a modification of a data structure in the sentence evaluation processing.

FIG. 9 illustrates an example where the second tree LSTM processing unit 32*a* recognizes a reference sentence "This is a pen" by using a tree structure. In the example illustrated in FIG. 9, the number of child nodes recognized by each HT-LSTM unit 32*a* (S15) is different. Such a tree structure can be applied to processing in steps S15 to S19, with the reference sentence "This is a pen" parsed in advance before the processing in step S15 and with the number of child node set each time the processing in step S15 is executed.

In the example illustrated in FIG. 9, the second tree LSTM processing unit 32*a* recognizes the words "This", "is", "a", and "pen" as one node at a time, then recognizes a phrase "is a pen" as a parent node with three words "is", "a", and "pen" as child nodes, and recognizes the root node from "This" and "is a pen". Thus, the processing in step S20 or later can be executed as appropriate, also with elements recognized based on a tree structure unique to a reference sentence.

2-4. HT-LSTM

The HT-LSTM units 5 and 5' of the first and the second tree LSTM processing units 31*a* and 32*a* described above execute calculation processing for the HT-LSTM according to an example of the present disclosure. The HT-LSTM is a novel neural network obtained by reforming an LSTM as one type of neural network to achieve a capability of processing data including a tree structure and to achieve a variety of information transmission paths.

Figure 10:
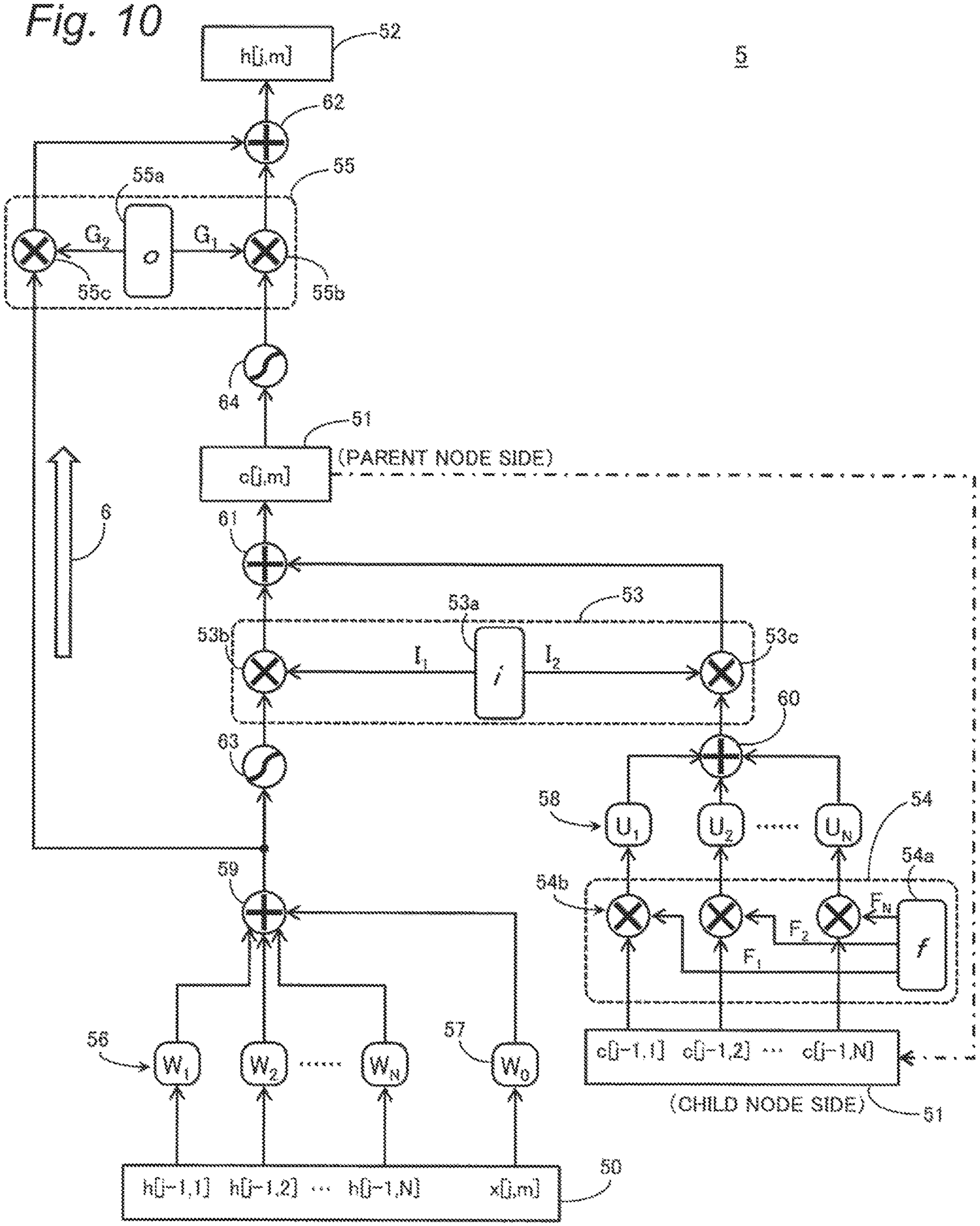
FIG. 10 is a diagram illustrating an HT-LSTM unit according to the first embodiment.

The HT-LSTM unit 5 that executes calculation processing for the HT-LSTM according to the present embodiment with no limitation on the data structure of the tree data as a whole, will be described with reference to FIG. 10. FIG. 10 is a diagram illustrating the HT-LSTM unit 5 according to the first embodiment.

As illustrated in FIG. 10, the HT-LSTM unit 5 includes an input layer 50, an intermediate layer 51, an output layer 52, an input gate 53, a forget gate 54, an output gate 55, linear conversion units 56 to 58, adders 59 to 62, and nonlinear conversion units 63 and 64. The HT-LSTM unit 5 generates an output vector h[j,m] as one element (parent node) of the tree data, by executing the HT-LSTM calculation processing based on the components described above. The output vector h[j,m] of the parent node includes a subscription j representing the generation number and a subscription m representing an identification number of the parent node.

The input layer 50 is a data buffer storing various vectors (variables) to be input to the HT-LSTM unit 5. The input layer 50 inputs an input vector x[j,m] and output vectors h[j−1,1], . . . , h[j−1,N] of child nodes (N is a natural number).

In the description below, the subscriptions "1" to "N" of the output vectors h[j−1,1] to h[j−1,N] of the child nodes are each a number identifying each one of a set of child nodes (brother nodes) corresponding to a certain parent node. The subscriptions "1" to "N" are set to be larger for a child node more on the left side in the processing target sentence and to be smaller for a child node more on the right side. In the example illustrated in FIG. 7, N is set to be 2.

The input vector x[j,m] is used when information indicating a word is input to the deep neural network 3 (FIG. 7) for example. For example, when j=1 holds true in step S10 in FIG. 8, the HT-LSTM unit 5 inputs the input vector x[1,m] representing a word in a 1-of-K representation, and outputs an output vector h[1,m] representing the word in the tree data. When j>1 holds true, x[j,m] is set to be 0.

The intermediate layer 51 is a data buffer that stores an intermediate vector c[j,m] generated as an intermediate result in the HT-LSTM unit 5 in the temporary memory 21*b* (FIG. 3) and the like.

In the HT-LSTM according to the present disclosure, the output vector h[j,m] of the parent node is generated with reference to the output vectors h[j−1,1] to h[j−1,N] of the child nodes as well as intermediate vectors c[j−1,1] to c[j−1,N] of the child nodes, as in the case of what is known as a tree LSTM (see K. S. Tai, et al., "Improved Semantic Representations From Tree-Structured Long Short Term Memory Networks", eprint arXiv:1503.00075, May 2015). In this process, the intermediate layer 51 functions as a memory that holds the intermediate vector c[j,m] generated for a node with a certain generation number j, until the node is referred to as a child node along with the incrementation of the generation number j (time delay).

The output layer 52 is a data buffer that stores the output vector h[j,m] of the parent node, generated as a result of the HT-LSTM processing by the HT-LSTM unit 5, in the storage 21*a* (FIG. 3) and the like.

The input gate 53 is a filter for controlling the information input from the input layer 50 and the like to extract information used as the processing target of the HT-LSTM unit 5. In the present embodiment, the input gate 53 includes a gate function generation unit 53*a* and two multipliers 53*b* and 53*c*.

The forget gate 54 is a filter for controlling information referred to by the intermediate layer 51 on the child node side holding the intermediate vectors c[j,1] to c[j,N] of the child nodes. The forget gate 54 includes a gate function generation unit 54*a* and multipliers 54*b* in the same number as the intermediate vectors c[j,1] to c[j,N] of the child nodes.

The output gate 55 is a filter for controlling information output as a result of the processing by the HT-LSTM unit 5. The output gate 55 includes a gate function generation unit 55*a* and two multipliers 55*b* and 55*c*.

The gate function generation units 53*a* to 55*a* generate gate functions used by the various gates 53 to 55. The gate function is a function for setting how much information is transmitted to the output side during the processing by the HT-LSTM unit 5, and has a value from 0 to 1 for example. Each gate function is a vector value function, and has a value based on a common function type for each vector component serving as an argument. Each gate function is defined by a unique learning parameter, and each argument is a vector input to the various gates 53 to 55 for example.

The multipliers 53*b* to 55*b*, 53*c*, and 55*c* calculates a product (Hadamard product) for each vector component to perform multiplication "×" between vectors. In the various gates 53 to 55, the multipliers 53*b* to 55*c* multiply various target vectors by gate functions. As a result, a value of the gate function closer to "1" results in information (component) in the multiplied vector being more likely to be transmitted to the output side, and the value closer to "0" results in the information being more likely to be blocked.

The linear conversion units 56 to 58 perform linear conversion on various vectors based on parameter matrices $W_0$ to $W_N$ and $U_1$ to $U_N$ each including unique learning parameters as matrix elements. For example, the linear conversion unit 56 performs the linear conversion individually on the output vectors h[j−1,1] to h[j−1,N] of the child nodes from the input layer 50 based on each of the parameter matrices $W_1$ to $W_N$ in accordance with the positions of the child nodes in the left to right direction.

The adders 59 to 62 calculate a sum of each vector components, to perform addition "+" between the vectors. For example, the adder 59 adds (sums up) all the results of linear conversion by the linear conversion units 56 and 57 on the output vectors h[j−1,1] to h[j−1,N] of the child node and the input vector x[j,m], to calculate the sum.

The nonlinear conversion units 63 and 64 are in charge of nonlinear conversion enabling expression of complex functions that cannot be expressed by the linear conversion only. The nonlinear conversion is performed by calculating, using a conversion target vector as an argument, a vector value function that is in the same dimension as the argument as in the case of the gate function, in a predetermined function type. The function type of the nonlinear conversion is set to be various activation functions such as sigmoid function, ReLU, tanh, or the like.

For example, the nonlinear conversion unit 63 performs the nonlinear conversion on the sum obtained by the adder 59. The vector as a result of the conversion by the nonlinear conversion unit 63 is input to the input gate 53.

In the input gate 53, the gate function generation unit 53*a* generates a gate function $I_1$ and the multiplier 53*b* multiplies the input vector by the gate function $I_1$. Thus, in the input gate 53, filtering for extracting information to be input to the intermediate layer 51 from the results of the conversion by the nonlinear conversion unit 63 is performed.

The intermediate vectors c[j−1,1] to c[j−1,N] of the child nodes are input from the child-node-side intermediate layer 51 to the forget gate 54. In the forget gate 54, the gate function generation unit 54*a* generates N gate functions $F_1$ to $F_N$ (N is also the number of the intermediate vectors c[j−1,1] to c[j−1,N] of the child nodes), and each of the multipliers 54*b* multiplies the corresponding one of the intermediate vectors by, the corresponding one of the gate functions $F_1$ to $F_N$. Thus, filtering is performed to eliminate (forget) unnecessary information from the intermediate vectors c[j−1,1] to c[j−1,N] of a plurality of child nodes.

The intermediate vectors of the child nodes as a result of the filtering by the forget gate 54 are each subjected to linear conversion by the linear conversion unit 58, and then the resultant values are summed up by the adder 60. In the present embodiment, the vector as the result of summing by the adder 60 is input to the input gate 53.

In the present embodiment, in the input gate 53, the gate function generation unit 53*a* generates a gate function $I_2$ different from the gate function $I_1$ for the vector as a result of the summing by the adder 60, to be used for the multiplication by the multiplier 53*c*. With such an input gate 53, tradeoff relationship can be established between information based on the sum of the output vectors of the child nodes from the nonlinear conversion unit 63 and the information based on the result of summing up the intermediate vectors of the child nodes by the adder 60. The intermediate vectors of the child nodes individually filtered by the forget gate 54 can be collectively filtered in the input gate 53.

The input gate 53 outputs two vectors, respectively filtered by the different gate functions $I_1$ and $I_2$ in the multipliers 53*b* and 53*c*, to the adder 61. The adder 61 adds the two different vectors from the input gate 53 to generate the intermediate vector c[j,m] (of the parent node). The intermediate vector c[j,m] is held in the intermediate layer 51 (on the parent node side) and is also subjected to the nonlinear conversion by the nonlinear conversion unit 64, and the resultant vector is input to the output gate 55.

In the output gate 55, the gate function generation unit 55*a* generates a gate function $G_1$ for the vector as a result of the conversion by the nonlinear conversion unit 64, and the multiplier 55*b* multiplies the vector by the gate function $G_1$. Thus, filtering is performed to control whether or not the information as a result of various calculations in the input layer 50 to the nonlinear conversion unit 64 is to be finally output.

In the HT-LSTM according to the present embodiment, a bypass 6 is created so that information from the input layer 50 can be input to the output layer 52 via the output gate 55 before being subjected to the nonlinear conversion. With the bypass 6 according to the present embodiment, the vector obtained by the adder 59 as a sum of the output vectors of the child nodes is input to the output gate 55.

In the output gate 55, the gate function generation unit 55*a* generates a gate function $G_2$ that is different from the gate function $G_1$, and the multiplier 55*c* in the bypass 6 multiplies the vector obtained by the adder 59 as a sum by the gate function $G_2$. Thus, filtering is implemented for extracting information, in the input layer 50, to be output without being unnecessarily converted.

The output gate 55 outputs the two vectors respectively filtered with the different gate function $G_1$ and $G_2$ in the multipliers 55*b* and 55*c* to the adder 62. The adder 62 adds the two different vectors from the output gate 55 to generate the output vector h[j,m] of a parent node, and outputs this vector to the output layer 52.

The output layer 52 stores the output vector h[j,m] generated as described above. The output vector h[j,m] thus stored is used as the output vector of a child node as appropriate, when the generation number j is incremented. The output vector stored in the output layer 52 can be read and used as the processing result obtained by the HT-LSTM unit 5 appropriately.

The HT-LSTM unit 5 according to the present embodiment uses the output gate 55 that controls the information to be output from the bypass 6, so that unnecessary calculation can be selectively avoided, and the HT-LSTM unit 5 can have a variety of information transmission paths.

The HT-LSTM unit 5 can selectively delete history information included in the intermediate state of a child node calculated in the past to prevent the performance from degrading. For example, the HT-LSTM unit 5 can reduce the adverse impact of information about a portion which does not make sense as a sentence, anticipated to be included in a translated sentence as a result of machine translation, on determination on the sentence as a whole.

2-5. Operation in Learning Mode

An operation performed by the sentence evaluation apparatus 2 described above in a learning mode for implementing machine learning of the deep neural network 3 is described with reference to FIG. 11.

Figure 11:
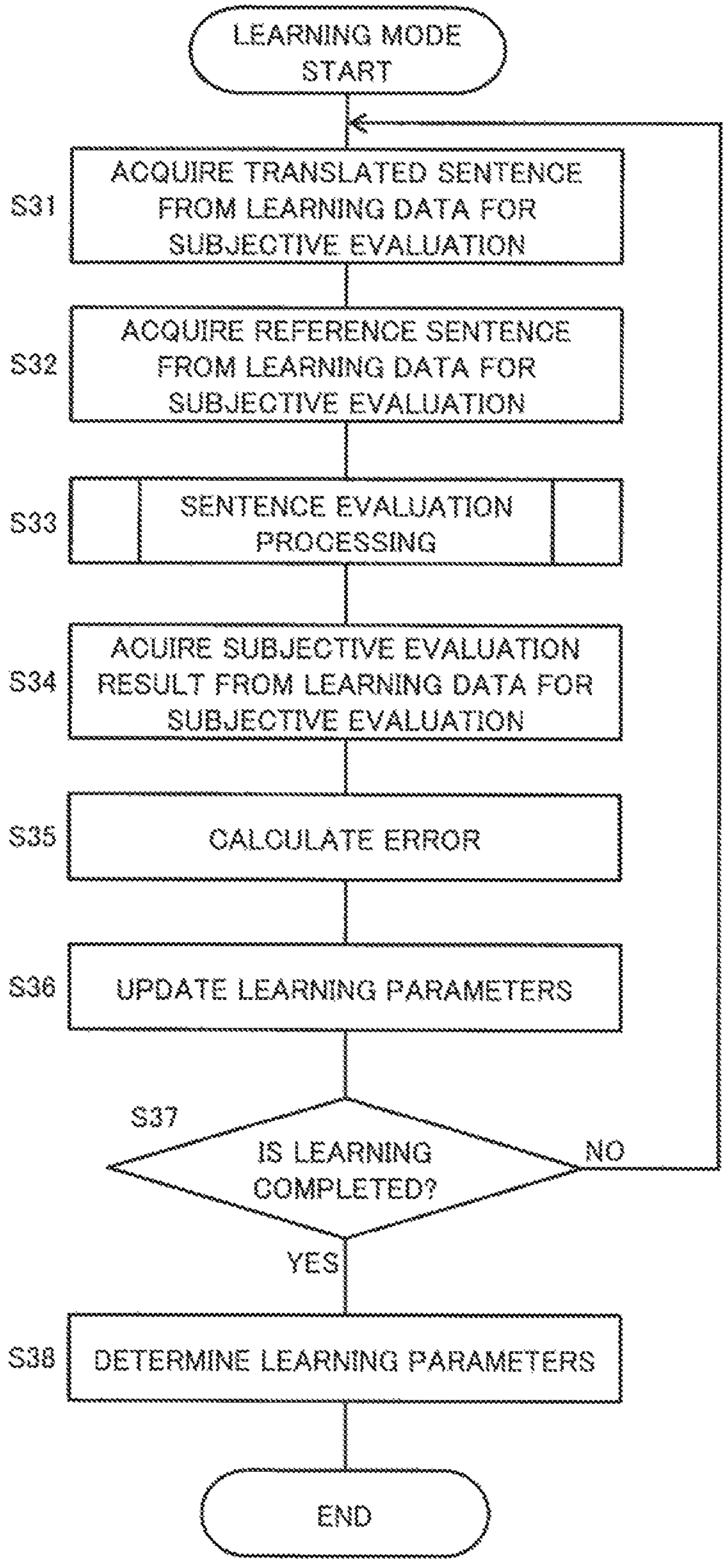
FIG. 11 is a flowchart illustrating an operation performed by the sentence evaluation apparatus in a learning mode.

FIG. 11 is a flowchart illustrating an operation of the sentence evaluation apparatus 2 in the learning mode. The flowchart in FIG. 11 is implemented by the processor 20 of the sentence evaluation apparatus 2.

At first, the processor 20 of the sentence evaluation apparatus 2 reads data about a single translated sentence from the learning data D2 for subjective evaluation stored in the storage 21*a*, to acquire a translated sentence to be learned by the deep neural network 3 (S31).

The processor 20 reads data about a reference sentence correlated with the acquired translated sentence in the subject evaluation learning data D2, to acquire a reference sentence to be learned by the deep neural network 3 (S32).

Next, the processor 20 executes the sentence evaluation processing with the deep neural network 3, based on the acquired translated sentence and reference sentence, as in step S3 in FIG. 6 (S33). The processing in step S33 is executed based on a learning parameter of a value set in advance for each of the first and the second encoders 31 and 32 as well as the fully connected layer 33 in the deep neural network 3 (FIG. 7). Thus, the similarity p is output as a result of estimating the probability of two input sentences having the same meaning by the deep neural network 3 based on the current learning parameters.

Next, the processor 20 acquires a subjective evaluation result correlated with the acquired translated sentence and reference sentence in the subjective evaluation learning data D2 (S34). For example, the processor 20 obtains a value "1" or "0" depending on whether the grade of the subjective evaluation result acquired is "Good(4)" or "So-so(3)".

The processor 20 calculates an error of the output from the sentence evaluation processing (S33) based on the current learning parameter relative to the acquired subjective evaluation result (S34) (S35). In step S35, the values obtained in steps S33 and S34 are each treated as a probability value, and the error is obtained by calculation performed by the processor 20 to obtain a cross entropy and the like between the two probability values. Specifically, the probability (similarity p) of the subjective evaluation result, calculated in step S33, having the grade "Good(4)" or "So-so(3)", as well as the error relative to the true value (S34) are calculated.

Next, the processor 20 adjusts the values of the various learning parameters in the deep neural network 3 based on backpropagation (S36). In step S36, the processor 20 calculates a gradient by differentiating the calculated error with a learning parameter, and updates each learning parameter in accordance with the gradient obtained. For example, when the error is “0”, the gradient is “0”, and thus the difference between the learning parameters before and after the updating is “0”.

Next, the processor 20 determines whether or not the deep neural network 3 has completed the learning using the subjective evaluation learning data D2 (S37). When the learning by the deep neural network 3 is not completed (NO in S37), the processing returns to step S31 and the processor 20 acquires new data from the subjective evaluation learning data D2 and executes the processing in or after step S31. The processing in steps S31 to S37 is repeated until the deep neural network 3 learns all the pieces of data in the subjective evaluation learning data D2.

When the learning using the subjective evaluation learning data D2 is completed (YES in S37), the processor 20 records the values of the various learning parameters after the learning in the storage 21*a* and the like, and determines the learning parameter to be employed for the sentence evaluation processing (S3 in FIG. 6) in the execution mode (S38).

The processing in this flowchart is terminated when the processor 20 determines the learning parameter (S38).

With the processing described above, the machine learning of the deep neural network 3 in the sentence evaluation apparatus 2 can be implemented. With the subject evaluation learning data D2, the learning can be implemented so that the sentence evaluation apparatus 2 acquires the human's subjective evaluation standard included in the learning data D2.

In the description above, the flowchart in FIG. 11 is terminated when the learning by the deep neural network 3 using the subjective evaluation learning data D2 stored in the storage 21*a* in advance is completed (YES in S37). The condition for terminating the learning in the sentence evaluation apparatus 2 is not limited to that in step S37. For example, after the subjective evaluation learning data D2 is learned, data for operation checking may be separately used to confirm the adaptability of the sentence evaluation apparatus 2 to unknown data, and whether or not the learning is completed may be determined in accordance with the result of the checking. Alternatively, a predetermined error function based on the output from the deep neural network 3 may be used, and whether or not the learning is completed may be determined based on whether or not the error function is equal to or larger than a predetermined value.

3. Conclusion

As described above, the sentence evaluation apparatus 2 according to the present embodiment evaluates an input sentence. The sentence evaluation apparatus 2 includes the various acquisition devices 22 to 25 and the processor 20. The acquisition devices 22 to 25 acquire information indicating a translated sentence serving as the first input sentence and information indicating a reference sentence serving as the second input sentence. The processor 20 executes information processing on the information acquired by the acquisition devices 22 to 25, with the deep neural network 3 that is an algorithm based on machine learning. The deep neural network 3 includes the first encoder 31 that recognizes the first input sentence and the second encoder 32 that recognizes the second input sentence. The processor 20 generates evaluation information indicating evaluation on the first input sentence with reference to the second input sentence, based on a result of the recognition by the first encoder 31 on the first input sentence and a result of the recognition by the second encoder 32 on the second input sentence.

The sentence evaluation apparatus 2 described above uses the two encoders 31 and 32, performing machine learning in the deep neural network to recognize input sentences, to be capable of facilitating appropriate automatic sentence evaluation.

In the present embodiment, the first and the second encoders 31 and 32 perform machine learning based on different learning parameters. With this configuration, the learning suitable for the translated sentence and the reference sentence is performed, to facilitate generation of evaluation information indicating appropriate evaluation on the translated sentence (first input sentence) with reference to the reference sentence (second input sentence).

In the present embodiment, the first encoder 31 recognizes, based on a predetermined data structure including a plurality elements, each element of the data structure corresponding to the first input sentence (S10 to S14). The first encoder 31 determines the importance of each element of the first input sentence relative to the second input sentence, by referring to the recognition result obtained by the second encoder 32 for the second input sentence (S20). Through the attention processing by the first encoder 31 (S20), the element of the first input sentence that is regarded as being important in terms of comparison with the second input sentence can be identified.

In the present embodiment, the processor 20 generates evaluation information indicating evaluation so as to reflect the determined importance. Thus, the evaluation information focusing on the translation result of an important portion in the translated sentence can be generated for example.

In the present embodiment, the predetermined data structure used by the encoder 31 for the recognition includes at least one of a tree structure including a parent node and child nodes and a data structure with a plurality of tree structures having child nodes overlapping each other. With the input sentence recognized using such a data structure, evaluation appropriately reflecting the structure of the sentence can be facilitated.

In the present embodiment, the second encoder 32 recognizes each element of the data structure of the second input sentence based on the predetermined data structure described above (S15 to S19). The second encoder 32 determines the importance of each element of the second input sentence with reference to the first input sentence, by referring to the result of the recognition by the first encoder 31 on the first input sentence (S21). Through the attention processing by the second encoder 32 (S21), the element of the reference sentence that is regarded as being important in terms of comparison with the translated sentence can be identified.

In the present embodiment, the deep neural network 3 further includes the fully connected layer 33 for performing calculation processing for integrating the result of recognition by the first encoder 31 on the first input sentence and the result of the recognition by the second encoder 32 on the second input sentence. Thus, the deep neural network 3 can output information obtained by integrating the results of the recognition from the first and the second encoders.

In the present embodiment, the fully connected layer 33 executes calculation processing based on a logistic function. Thus, the machine learning of a logit model integrating the results of the recognition from the first and the second encoders is implemented in the fully connected layer 33. The fully connected layer 33 is not limited to this, and may be formed of a 2-class classifier.

In the present embodiment, the first input sentence is a translated sentence obtained as a result of machine translation by the translation machine 1. The second input sentence is a reference sentence indicating an example of the reference sentence of the original sentence that is a target of the machine translation by the translation machine 1. The sentence evaluation apparatus 2 can automatically perform subjective evaluation on the translated sentence obtained by the translation machine 1 relative to the reference sentence.

In the present embodiment, the evaluation information includes information indicating similarity between the first and the second input sentences, classification of the first input sentence based on a plurality of grades, and a predetermined part in the first input sentence. A user of the sentence evaluation apparatus 2 can use various types of evaluation information to check the result of the automatic evaluation by the sentence evaluation apparatus 2.

The sentence evaluation method according to the present embodiment is a method of evaluating a sentence input to the sentence evaluation apparatus 2. The method includes a step (S1) of acquiring information indicating a first input sentence and a step (S2) of acquiring information indicating a second input sentence. The method includes a step (S10 to S14) of recognizing the first input sentence by the first encoder 31 based on machine learning. The method includes a step (S15 to S19) of recognizing the second input sentence by the second encoder 32 different from the first encoder 31. The method includes a step (S22) of generating evaluation information indicating evaluation on the first input sentence relative to the second input sentence, based on the result of the recognition by the first encoder 31 on the first input sentence and the result of the recognition by the second encoder 32 on the second input sentence.

The sentence evaluation method can facilitate appropriate automatic sentence evaluation, through recognition on the input sentences by the two encoders 31 and 32 that perform machine learning in the deep neural network.

Modification of First Embodiment

In the first embodiment, the sentence evaluation apparatus 2 performs automatic evaluation with the translated sentence and the reference sentence serving as input sentences. However, the input sentence is not limited to these. A modification where the sentence evaluation apparatus 2 evaluates the accuracy of a translated sentence, with the translated sentence and the original sentence serving as the input sentences is described with reference to FIG. 12.

Figure 12:
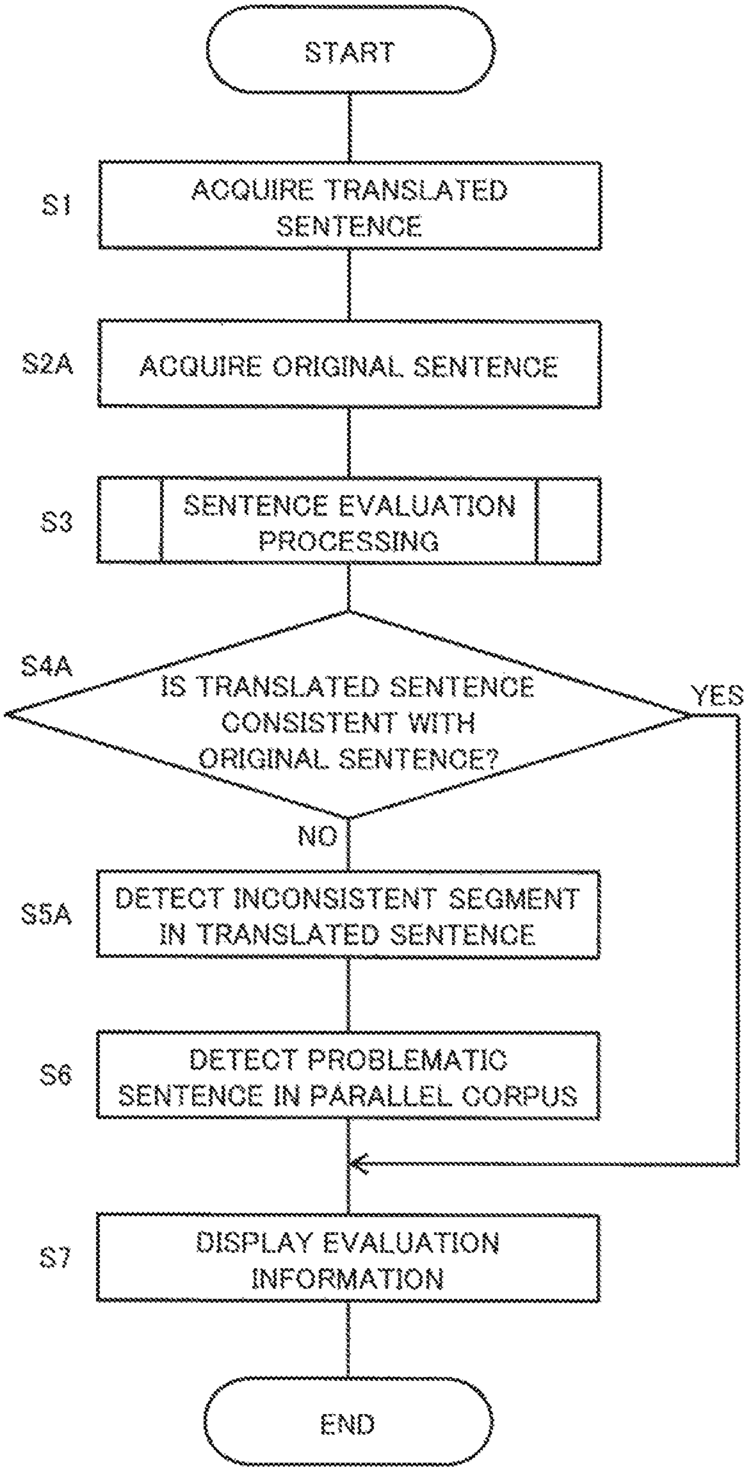
FIG. 12 is a flowchart illustrating an operation performed by a sentence evaluation apparatus according to a modification of the first embodiment in the execution mode.

FIG. 12 is a flowchart illustrating an operation performed by the sentence evaluation apparatus 2 according to the modification of the first embodiment in the execution mode. As illustrated in FIG. 12, the sentence evaluation apparatus 2 acquires the original sentence, being a target of translation, as the second input sentence to be compared with the translated sentence (first input sentence), in an execution mode similar to that in the first embodiment (S2A). The acquired original sentence is input to the second encoder 32 in the deep neural network 3, and sentence evaluation processing similar to that in the first embodiment is executed (S3).

In the deep neural network 3 where the sentence evaluation processing is executed, calculation processing based on a logistic function is executed in the fully connected layer 33 based on results of encoding by the first and the second encoders 31 and 32 as in the first embodiment. Here, a value with the range from 0 and 1 output from the fully connected layer 33 indicates consistency in a case where the original sentence is translated into the translated sentence in a different language. The machine learning of the deep neural network 3 is performed in advance by using predetermined learning data, so that such an output indicating the consistency can be obtained.

Based on this information indicating consistency obtained by the sentence evaluation processing (S3 in FIG. 12) in the execution mode, the sentence evaluation apparatus 2 determines whether or not the translated sentence is consistent with the original sentence, through determination using a threshold value as in step S4 in FIG. 8 (S4A).

Upon determining that the translated sentence is not consistent with the original sentence (S4A), the sentence evaluation apparatus 2 detects a certain part in the translated sentence based on a result {α[j,n]} of determining the importance through the attention processing as in the first embodiment (S5). In this case, the certain part detected is an inconsistent segment where the translated sentence is inconsistent with the original sentence.

Also in the following steps S6 and S7, the sentence evaluation apparatus 2 executes the processing as in the first embodiment with accuracy acquired in advance as appropriate.

With the processing described above, the sentence evaluation apparatus 2 can automatically evaluate the accuracy of the translated sentence from the original sentence.

Second Embodiment

A second embodiment is described below with reference to a drawing. In the HT-LSTM (FIG. 10) according to the first embodiment, the information from the input layer 50 is collectively filtered in the input gate 53. In the second embodiment, an HT-LSTM individually filtering the information from the input layer will be described.

The information processing device 2 according to the present embodiment will be described below, while omitting the description on configurations and operations that are the same as those in the information processing device 2 according to the first embodiment.

Figure 13:
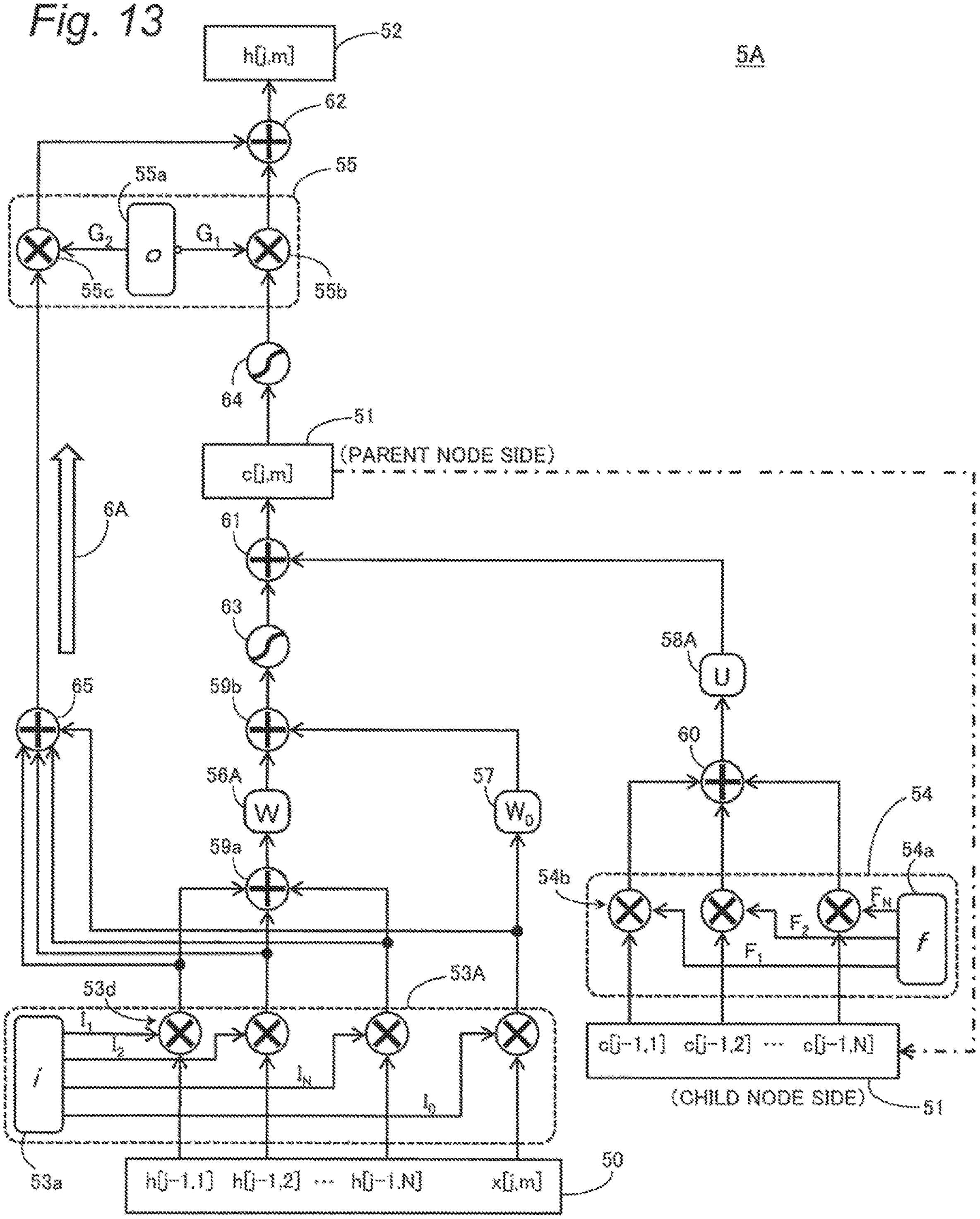
FIG. 13 is a diagram illustrating an HT-LSTM unit according to a second embodiment.

FIG. 13 is a diagram illustrating an HT-LSTM unit 5A according to the second embodiment. This HT-LSTM unit 5A according to the present embodiment establishes a neural network for the HT-LSTM according to the present embodiment in the processor 20 of the sentence evaluation apparatus 2 according to the first embodiment for example.

As illustrated in FIG. 13, the HT-LSTM unit 5A illustrated in the present embodiment has the same configuration as the first embodiment (FIG. 10), except that an input gate 53A that receives vectors individually from the input layer 50 is provided instead of the input gate 53.

The input gate 53A according to the present embodiment includes the gate function generation unit 53*a* and the multipliers 53*d* in the same number as the number of vectors to be input from the input layer 50. In the input gate 53A, the gate function generation unit 53*a* generates gate functions $I_0$ to $I_N$ in the same number as the vectors from the input layer 50, and each of the multipliers 53*d* multiplies a corresponding one of the vectors by a corresponding one of the gate functions $I_0$ to $I_N$. Thus, the output vectors h[j−1,1] to h[j−1,N] of the child nodes from the input layer 50 are individually filtered based on the respective gate functions $I_0$ to $I_N$.

As illustrated in FIG. 10, the HT-LSTM unit 5A further includes an adder 65 for forming a bypass 6A according to the present embodiment. The vectors filtered in the input gate 53 are summed up in the bypass 6A of the adder 65. The vector as a result of the summing by the adder 65 is input to the output gate 55 in the bypass 6A.

With the bypass 6A according to the present embodiment, the output gate 55 controls the output to the output layer 52 so that the information filtered in the input gate 53A in accordance with the gate function $G_2$ is simply included in the output vector h[j,m]. In an example of the present embodiment, calculation efficiency is improved with the two gate functions $G_1$ and $G_2$ in the output gate 55 set in a complementary relationship ($G_2=1-G_1$).

In the present embodiment, the adder 59*a* adds an output vector of the child node filtered by the input gate 53, separately from the output via the bypass 6A, and the vector as the result of the adding is subjected to linear conversion in the linear conversion unit 56A using a parameter matrix W for the vector. The vector converted by the linear conversion unit 56A is added to the input vector as a result of the linear conversion through the input gate 53A in the adder 59*b* in a case where the input vector x[j,m] is used, and is converted by the nonlinear conversion unit 63.

As described above, the linear conversion on the output vectors of the child nodes is integrated using the parameter matrix W. Furthermore, in the present embodiment, the liner conversion on the intermediate vectors of the child nodes is integrated using the parameter matrix U in the linear conversion unit 56A. The linear conversion with the parameter matrix U is performed on the vector as a result of summing filtered intermediate vectors c[j−1,1] to h[j−1,N] of the child nodes from the intermediate layer 51 by the forget gate 54. Such a setting of the parameter matrices W and U is merely an example, and may be changed to be individually set for each of vectors for example.

As described above, the HT-LSTM according to the present embodiment is a neural network established as the HT-LSTM unit 5A in the information processing device such as the sentence evaluation apparatus 2 to generate the output vector h[j,m] of a parent node from child nodes in the tree structure. The HT-LSTM unit 5A includes the input layer 50 that inputs output vectors h[j−1,1] to h[j−1,N] of a set of child nodes and the input gate 53A that controls the information to be extracted from the input layer 50. The HT-LSTM unit 5A includes the intermediate layer 51 that holds intermediate vectors c[j,m] and c[j−1,1] to, c[j−1,N] of nodes involved in the generation of the output vectors h[j,m] and h[j−1,1] to h[j−1,N], and the forget gate 54 that controls information referred to by the intermediate layer 51. The HT-LSTM unit 5A includes the output layer 52 that stores output vector h[j,m] of the parent node and the output gate 55 that controls information to be output to the output layer 52 as the output vector of the parent node based on the output vectors and intermediate vectors of the child nodes. In the HT-LSTM unit 5A, the input gate 53A individually extracts information from the output vectors h[j−1,1] to h[j−1,N] of a set of child nodes. With the output gate 55, the information to be output to the output layer 52 includes the information extracted by the input gate 53A.

With the HT-LSTM unit 5A described above, the positions of the plurality of child nodes in the left to right direction are identified in the input gate 53A. This facilitates learning in accordance with the order of words in the target sentence.

For example, this facilitates learning to determine the unnecessary information, such that the same words repeated unnecessary (e.g., "turn turn left"), in the input sentence (translated sentence) input to the sentence evaluation apparatus 2. Specifically, with the HT-LSTM unit 5A, when information about the consecutive words "turn", "turn", and "left" input as a set of child nodes, information about one "turn" can be individually eliminated from the consecutive words in the input gate 53A. Thus, the HT-LSTM can facilitate machine learning of various determinations performed for a data structure such as a tree structure.

Modification of Second Embodiment

The HT-LSTM according to the present disclosure is not limited to the examples in the first and the second embodiments described above, and may be modified in various ways. Modifications of the HT-LSTM will be described with reference to FIGS. 14 and 15.

Figure 14:
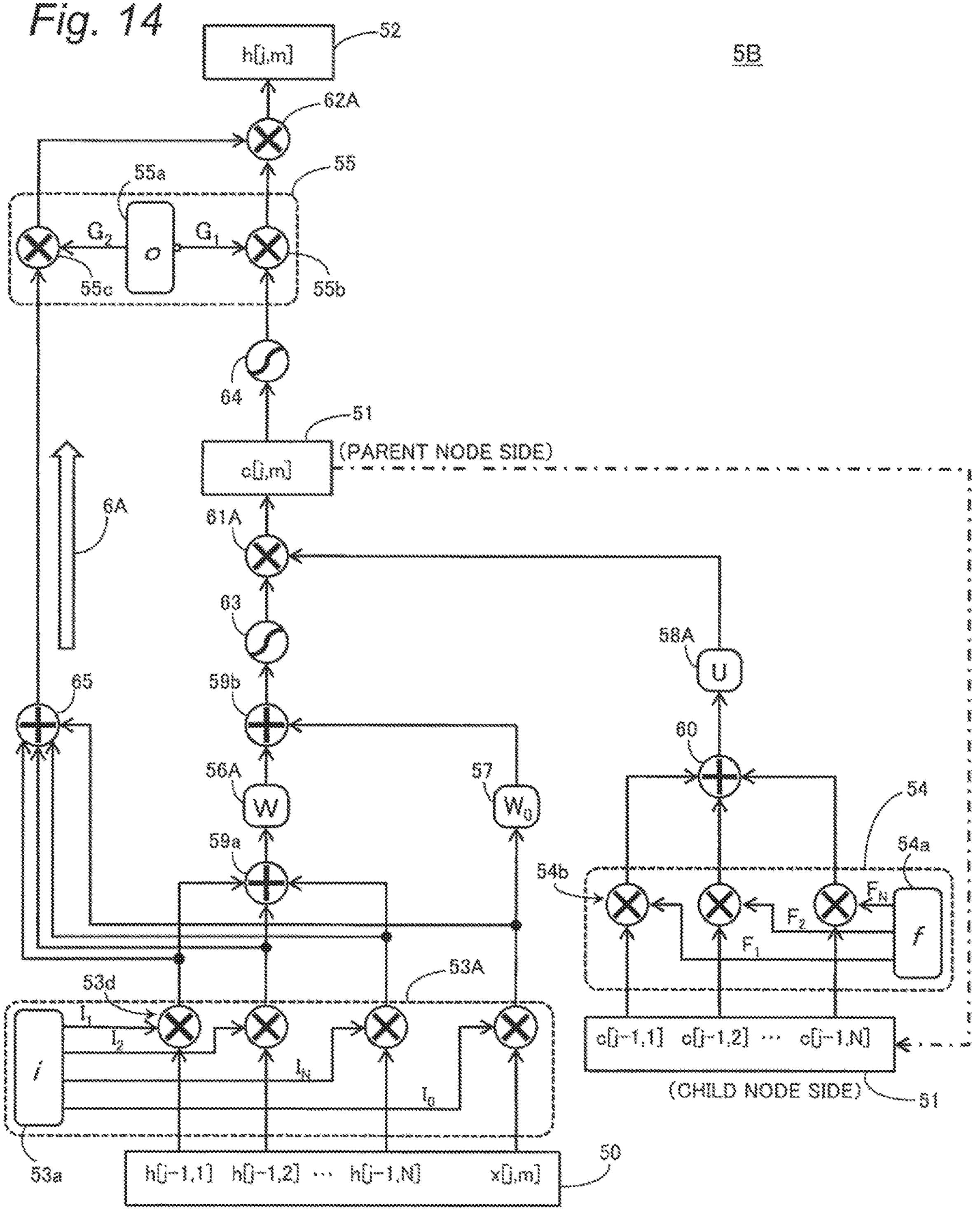
FIG. 14 is a diagram illustrating an HT-LSTM unit according to a first modification of the second embodiment.

FIG. 14 is a diagram illustrating an HT-LSTM unit 5B according to a first modification of the second embodiment. The HT-LSTM unit 5B according to the present modification includes multipliers 51A and 62A instead of the adders 61 and 62 of the HT-LSTM unit 5A according to the second embodiment.

The multiplier 61A performs multiplication to combine a vector derived from the output vectors of the child nodes from the input layer 50 with a vector derived from the intermediate vectors of the child nodes. The multiplier 62A performs multiplication to combine a vector as a result of converting the intermediate vector c[j,m] of the parent node with a vector bypassed from the input layer 50 through the bypass 6A. Such multiplication for combining different types of vectors can achieve a better updating rule for machine learning, and performance and convergence speed can be improved.

In this modification, the adders 61 and 62 of the HT-LSTM unit 5A according to the second embodiment are replaced with the multipliers 51A and 62A. However this should not be construed in a limiting sense, and one of the adders 61 and 62 may be replaced with a multiplier. Another adder in the HT-LSTM unit 5A may be replaced with a multiplier instead of or in addition to the adders 61 and 62.

Figure 15:
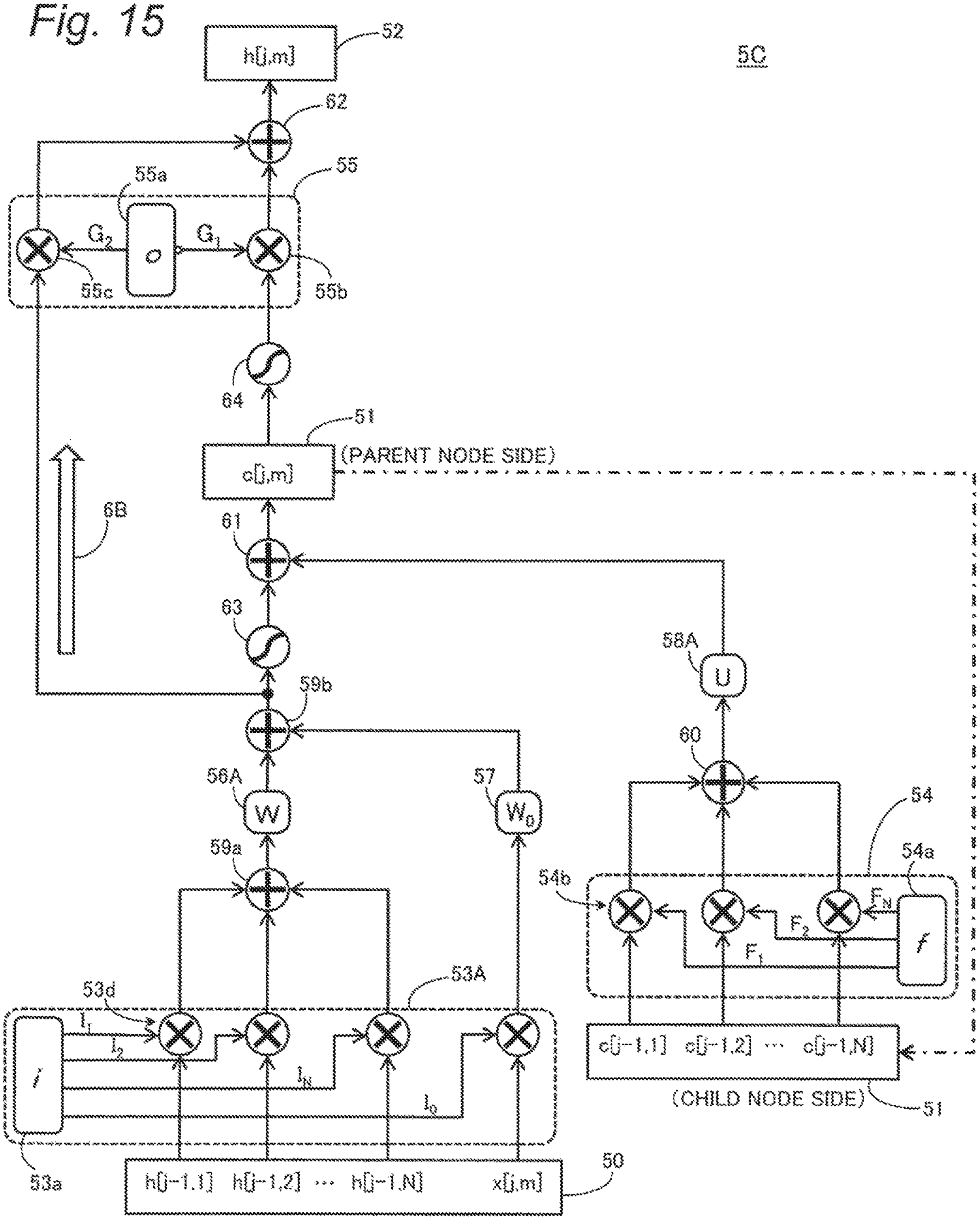
FIG. 15 is a diagram illustrating an HT-LSTM unit according to a second modification of the second embodiment.

FIG. 15 is a diagram illustrating an HT-LSTM unit 5C according to a second modification of the second embodiment. The HT-LSTM unit 5C according to this modification includes a bypass 6B through which information as a result of conversion by the linear conversion units 56A and 57 is bypassed, instead of the bypass 6A of the HT-LSTM unit 5A according to the second embodiment.

Also with the bypass 6B according to this modification, the information before the nonlinear conversion by the nonlinear conversion unit 63 can be bypassed to the output gate 55, and the HT-LSTM can have variety of information transmission paths. The bypass in the HT-LSTM can be set appropriately as long as information output from the output gate 55 including information extracted in the input gate 53A can be controlled.

The modifications such as those in the first and the second modifications for the HT-LSTM unit 5A according to the second embodiment can be appropriately made on the HT-LSTM unit 5 according to the first embodiment.

Other Embodiments

The first and the second embodiments are described as example of the technique disclosed in the present application. It is to be noted that the technique according to the present disclosure is not limited to these, and may be applied to embodiments as a result of appropriate modification, replacement, addition, omission, and the like. Furthermore, the elements described in the embodiments may be combined to make a new embodiment. In this context, examples of other embodiments are described below.

In the example of the embodiments described above, the sentence evaluation apparatus 2 receives the first input sentence that is a translated sentence from an original sentence and the second input sentence that is a reference sentence corresponding to the translated sentence and a sentence (reference sentence) to be referred as the source of the first input sentence such as the original sentence. The target of evaluation by the sentence evaluation apparatus 2 is not limited to a translated sentence with a corresponding translation source, and various sentences may be used as the first input sentence as the evaluation target. In such a case, the second input sentence is set to be a reference sentence corresponding to the first input sentence in various correlation relationship for example. The second input sentence may not particularly be a reference sentence. For example, the sentence evaluation apparatus 2 may be used for evaluating similarity or consistency between two random sentences in terms of meaning.

The configuration of the deep neural network 3 according to the present disclosure is not limited to an example described in the above embodiments. For example, an LSTM or a Bidirectional LSTM may be used together with the first and second tree LSTM processing units 31*a* and 31*b* in the deep neural network 3. The LSTM and the like may calculate words arranged in time series in each input sentence, and the output as a result of the calculation may be input to the first and the second tree LSTM processing units 31*a* and 31*b*.

In each of the embodiments described above, the deep neural network 3 for the sentence evaluation processing is established using the HT-LSTM units 5, 5', and 5A to 5C implementing the HT-LSTM according to the present disclosure. The deep neural network according to the present disclosure is not limited to this and the tree LSTM processing units 31*a* and 31*b* may employ what is known as a tree LSTM instead of the HT-LSTM (see K. S. Tai, et al., "Improved Semantic Representations From Tree-Structured Long Short Term Memory Networks", eprint arXiv: 1503.00075, May 2015).

The HT-LSTM units 5, 5', and 5A to 5C implementing the HT-LSTM according to the present disclosure are not limited to the deep neural network 3 for sentence evaluation processing, and may be applied to various information processing devices and methods based on machine learning. The information processing device and method employing the HT-LSTM according to the present disclosure can achieve a task of facilitating learning of various determination in machine learning on a systematic data structure such as a tree structure.

The embodiments are described as an example of the technique according to the present disclosure. The attached drawings and the detail description was provided for this object.

Thus, some elements in the attached drawings and the detailed description are provided for describing an example of the technique and may not be essential for achieving the task. This means that such non-essential elements in the attached drawings and the detail description should not be directly deemed as the essential elements.

The embodiments described above are provided as an example of the technique of the present disclosure, and thus modification, replacement, addition, omission, and the like can be performed thereon in various ways without departing from the scope of claims and their equivalents.

The present disclosure can be applied to various techniques for automatically evaluating various sentences, and can be used for evaluating the performance of a translation machine.

The invention claimed is:

1. A sentence evaluation apparatus for evaluating a sentence which is input, the sentence evaluation apparatus comprising:

an acquisition device that acquires information indicating a first input sentence and information indicating a second input sentence; and a processor that executes information processing on the information acquired by the acquisition device, using an algorithm based on machine learning, wherein the processor includes a first encoder that recognizes the first input sentence and a second encoder that recognizes the second input sentence, in the algorithm based on the machine learning, and the processor generates evaluation information indicating evaluation on the first input sentence with reference to the second input sentence, based on a result of recognition by the first encoder on the first input sentence and a result of recognition by the second encoder on the second input sentence.

2. The sentence evaluation apparatus according to claim 1, wherein the first and second encoders perform machine learning based on different learning parameters.

3. The sentence evaluation apparatus according to claim 1, wherein the first encoder performs recognition, based on a predetermined data structure including a plurality of elements, on each element of the data structure corresponding to the first input sentence, and refers to the result of the recognition by the second encoder on the second input sentence, to determine an importance of each element in the first input sentence with reference to the second input sentence.

4. The sentence evaluation apparatus according to claim 3, wherein the processor generates the evaluation information indicating the evaluation so as to reflect the determined importance.

5. The sentence evaluation apparatus according to claim 3, wherein the predetermined data structure includes at least one of a tree structure including a parent node and child nodes, and a data structure including a plurality of tree structures with child nodes overlapping each other.

6. The sentence evaluation apparatus according to claim 1, wherein the second encoder performs recognition, based on a predetermined data structure including a plurality of elements, on each element of the data structure in the second input sentence, and refers to the result of the recognition by the first encoder on the first input sentence to determine an importance of each element in the second input sentence with reference to the first input sentence.

7. The sentence evaluation apparatus according to claim 1, wherein the processor further includes a fully connected layer that executes calculation processing for integrating the result of the recognition by the first encoder on the first input sentence and the result of the recognition by the second encoder on the second input sentence, in the algorithm based on the machine learning.

8. The sentence evaluation apparatus according to claim 7, wherein the fully connected layer executes the calculation processing based on a logistic function.

9. The sentence evaluation apparatus according to claim 1, wherein the first input sentence is a translated sentence as a result of machine translation by a translation machine, and the second input sentence is any one of an original sentence and a reference sentence, the original sentence being a target of the machine translation by the translation machine and the reference sentence being an exemplary sentence to which the original sentence is correctly translated.

10. The sentence evaluation apparatus according to claim 1, wherein the evaluation information includes information indicating at least one of similarity between the first and the second input sentences, consistency of the first input sentence with reference to the second input sentence, classification of the first input sentence based on a plurality of grades, and a predetermined part in the first input sentence.

11. A sentence evaluation method of evaluating a sentence which is input to a sentence evaluation apparatus, the sentence evaluation method comprising:

acquiring information indicating a first input sentence;

acquiring information indicating a second input sentence;

recognizing the first input sentence by a first encoder based on machine learning;

recognizing the second input sentence by a second encoder that is different from the first encoder; and generating evaluation information indicating evaluation on the first input sentence with reference to the second input sentence, based on a recognition result obtained by the first encoder for the first input sentence and a recognition result obtained by the second encoder for the second input sentence.

* * * * *